(12) United States Patent
Porter et al.

(10) Patent No.: US 12,333,843 B2
(45) Date of Patent: Jun. 17, 2025

(54) SYSTEMS AND METHODS FOR SECURE MANAGEMENT OF DOCUMENT EXECUTION

(71) Applicant: EscrowTab, Inc., Tempe, AZ (US)

(72) Inventors: Kolin Blain Porter, Tempe, AZ (US); Logan Turley, Scottsdale, AZ (US); Faisal Nawaz, Brooklyn, NY (US)

(*) Notice: Subject to any disclaimer, the term of this patent is extended or adjusted under 35 U.S.C. 154(b) by 461 days.

(21) Appl. No.: 17/934,715

(22) Filed: Sep. 23, 2022

(65) Prior Publication Data

US 2024/0104950 A1  Mar. 28, 2024

(51) Int. Cl.
G06V 30/412 (2022.01)
G06F 40/186 (2020.01)
G06V 30/148 (2022.01)

(52) U.S. Cl.
CPC .......... *G06V 30/412* (2022.01); *G06F 40/186* (2020.01); *G06V 30/153* (2022.01)

(58) Field of Classification Search
CPC .. G06V 30/412; G06V 30/153; G06V 30/413; G06V 30/10; G06V 30/41; G06V 30/416; G06F 40/18; G06F 40/131; G06F 40/166
See application file for complete search history.

(56) References Cited

U.S. PATENT DOCUMENTS

| | | |
|---|---|---|
| 7,281,133 B2 | 10/2007 | Ginter |
| 7,739,511 B2 | 6/2010 | Horne |
| 7,970,722 B1 | 6/2011 | Owen |
| 8,341,141 B2 | 12/2012 | Krislov |
| 8,549,303 B2 | 10/2013 | Fifield |
| 8,572,134 B2 | 10/2013 | Van Rooyen |
| 10,210,570 B2 | 2/2019 | Bennett |
| 10,212,144 B2 | 2/2019 | Guthery |
| 10,713,714 B2 | 7/2020 | Porter |
| 10,885,580 B2 | 1/2021 | Porter |
| 2004/0199876 A1 | 10/2004 | Ethier |
| 2005/0177389 A1 | 8/2005 | Rakowicz |
| 2006/0277123 A1 | 12/2006 | Kennedy |
| 2008/0028220 A1 | 1/2008 | Wyssen |
| 2008/0292130 A1 | 11/2008 | Nafarieh |
| 2010/0106651 A1* | 4/2010 | Tate ............... G06Q 40/00 705/26.1 |
| 2011/0179289 A1 | 7/2011 | Guenther |
| 2012/0221944 A1 | 8/2012 | Bloomfield |

(Continued)

*Primary Examiner* — Iriana Cruz
(74) *Attorney, Agent, or Firm* — Taft Stettinius & Hollister LLP; John Wray Carpenter

(57) ABSTRACT

A method of managing document execution can include receiving an electronic document; performing an OCR the document to recognize text characters and their coordinates; identifying signature coordinate(s) of signature element(s) in the document; creating an interaction layer including a signature input field at each signature coordinate; assembling a processed document; communicating the processed document to a touchscreen device; assigning an execution device to each signer; receiving each signer's signature in the appropriate signature input field; creating a finalized document by preventing further modification of the interaction layer; and communicating the finalized document to a recordation facility for formal recordation of the finalized document.

19 Claims, 12 Drawing Sheets

(56) References Cited

U.S. PATENT DOCUMENTS

| | | | |
|---|---|---|---|
| 2015/0150141 A1* | 5/2015 | Szymanski | G06F 21/64 |
| | | | 726/26 |
| 2016/0321214 A1 | 11/2016 | Hickey | |
| 2018/0053265 A1 | 2/2018 | Lyon | |
| 2018/0239959 A1 | 8/2018 | Bui | |
| 2018/0267946 A1 | 9/2018 | Dang | |
| 2018/0293647 A1* | 10/2018 | Porter | G06F 40/103 |
| 2021/0082041 A1* | 3/2021 | Porter | G06Q 40/02 |
| 2022/0398284 A1* | 12/2022 | Singh | G06F 40/174 |
| 2024/0185339 A1* | 6/2024 | Iannitti | G06V 30/412 |

* cited by examiner

SYSTEMS AND METHODS FOR SECURE MANAGEMENT OF DOCUMENT EXECUTION

CROSS REFERENCE TO RELATED APPLICATIONS

This application is related to U.S. patent application Ser. No. 17/886,060 filed Aug. 11, 2022 and entitled "SYSTEMS AND METHODS FOR ELECTRONIC DOCUMENT NOTARIZATION". This application is related to U.S. patent application Ser. No. 17/666,477 filed Feb. 7, 2022 and entitled "SYSTEMS AND METHODS FOR SECURE DOCUMENT MANAGEMENT". This application is related to U.S. patent application Ser. No. 17/467,152 filed Sep. 3, 2021 and entitled "SYSTEMS AND METHODS FOR ELECTRONIC DOCUMENT EXECUTION". U.S. patent application Ser. No. 17/467,152 filed Sep. 3, 2021 is a continuation-in-part of U.S. patent application Ser. No. 17/105,185 filed on Nov. 25, 2020 and entitled "EscrowTab Mobile Application System and Method", which is a continuation of U.S. patent application Ser. No. 16/896,458 filed on Jun. 9, 2020, which issued as U.S. Pat. No. 10,885,580 on Jan. 5, 2021 and which is a continuation of U.S. patent application Ser. No. 15/732,807 filed on Jan. 3, 2018, which issued as U.S. Pat. No. 10,713,714 on Jul. 14, 2020 and which is a non-provisional of U.S. Patent Application No. 62/498,865 filed on Jan. 10, 2017. Each of these documents are incorporated herein by specific reference.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The present disclosure relates generally to document execution and more specifically relates to securely managing electronic document execution.

Description of the Related Art

Historically, important legal documents, such as those related to mortgage transactions, have been handled in paper form. This can be cumbersome and inefficient.

Therefore, more recently, there have been efforts to handle execution of these and other documents electronically. However, many such systems are not satisfactory from a user perspective, from an industry perspective, or both.

U.S. Patent Application No. 20120221944 describes a "system [that] electronically prepares, escrows and stores in a server cloud a digital representation of a paper document, copies of which may be modified by wet ink pen marks in different geographic locations. The wet ink pen marks are digitized and stored with the escrowed document, through use of digital devices such as digital wet ink pens. As the digitized wet ink pen marks are created, parties may view the escrowed document and digitized wet ink pen marks in near real-time in different geographic locations. After the parties finish placing wet ink marks, such as signatures on a closing document, the document may be released from escrow for printing and/or storage."

U.S. Patent Application No. 20150150141 describes "methods, systems and computer program products for providing remote document execution. Such methods, systems and computer program products may include storing an electronic document as a secure electronic file, identifying a signature space in the electronic document, the signature space, after being executed, includes a signature of a signing party of the electronic document, receiving the signature of the signing party into the electronic document stored as the secure electronic file and responsive to receiving the signature of the signing party, converting the electronic document into a read only electronic document."

However, none of these systems provide the unique advantages of the present inventions.

BRIEF SUMMARY OF THE INVENTION

Applicants have created new and useful devices, systems and methods for securely managing document execution.

In at least one embodiment, a method of managing document execution can include receiving a document; analyzing and/or processing the document; communicating the processed document; assigning one or more execution devices for use with the document; monitoring execution of the document; notarizing the document; finalizing the document; recording the document; or any combination thereof.

In at least one embodiment, analyzing and/or processing the document can include identifying a template for the document; performing an optical character recognition on the document; identifying one or more signature elements in the document; identifying a notarization element in the document; or any combination thereof. In at least one embodiment, analyzing and/or processing the document can include creating a base layer including the document; creating a text layer including the text recognized the document; creating an interaction layer including input fields for the elements recognized from the document; assembling the layers; or any combination thereof.

In at least one embodiment, the method can include receiving a received document from an originating agent. In at least one embodiment, the document can be received in PDF format and/or comprise one or more pages. In at least one embodiment, the document can be received at a processing location. In at least one embodiment, the document can be received from a computer system of an originating agent, such as at an originating agent location. In at least one embodiment, the method can include receiving, at a processing location, a received document in PDF format from a computer system of an originating agent at an originating agent location, the received document comprising one or more pages.

In at least one embodiment, the method can include receiving origination information about the document. In at least one embodiment, the method can include receiving, at the processing location, origination information about the received document from the originating agent.

In at least one embodiment, the method can include identifying a template identified by analysis of the information and/or the received document. In at least one embodiment, the template can be identified and/or saved in a repository at the processing location. In at least one embodiment, the method can include identifying, at the processing location, a template saved in a repository at the processing location, wherein the template is identified by analysis of the information and the received document.

In at least one embodiment, the method can include performing an optical character recognition (OCR) of document. In at least one embodiment, the OCR can be performed on any or all of the pages of the document. In at least one embodiment, the OCR can recognize text characters and their coordinates in the document. In at least one embodiment, the OCR can be performed at the processing location. In at least one embodiment, the method can include performing, at the processing location, an optical character recognition of each page of the received document to recognize text characters and their coordinates on each page of the received document.

In at least one embodiment, the method can include identifying one or more signature elements in the received document. In at least one embodiment, the method can include identifying a first signature coordinate of a first signature element corresponding to a first signer and a second signature coordinate of a second signature element corresponding to a second signer. In at least one embodiment, the first signer and the second signer can be the same or different people. In at least one embodiment, identifying the signature element(s) can be performed at the processing location and/or with reference to the template. In at least one embodiment, the method can include identifying, at the processing location with reference to the template, at least two signature elements in the received document including a first signature coordinate of a first signature element corresponding to a first signer and a second signature coordinate of a second signature element corresponding to a second signer, wherein the first signer and the second signer are different people.

In at least one embodiment, the method can include identifying at least one notarization coordinate of a notarization element in the received document. In at least one embodiment, the notarization element can correspond to a signing agent. In at least one embodiment, identifying the notarization coordinate(s) can be performed at the processing location and/or with reference to the template. In at least one embodiment, the method can include identifying, at the processing location with reference to the template, at least one notarization coordinate of a notarization element in the received document, the notarization element corresponding to a signing agent.

In at least one embodiment, the method can include creating a base layer for the document. In at least one embodiment, the base layer can include each page of the received document. In at least one embodiment, a base layer can be created for each page of the received document. In at least one embodiment, a base layer can be created at the processing location. In at least one embodiment, the method can include creating, at the processing location, a base layer for each page of the document, the base layer including each page of the received document.

In at least one embodiment, the method can include creating a text layer. In at least one embodiment, the text layer can be separate from the base layer and/or include the text recognized from each page of the received document. In at least one embodiment, the text layer can include each page of the received document. In at least one embodiment, a text layer can be created for each page of the received document. In at least one embodiment, a text layer can be created at the processing location. In at least one embodiment, the method can include creating, at the processing location, a text layer for each page of the document, the text layer being separate from the base layer and including the text recognized from each page of the received document.

In at least one embodiment, the method can include creating an interaction layer the document. In at least one embodiment, the interaction layer can be separate from the base layer and/or the text layer. In at least one embodiment, the interaction layer can be translucent. In at least one embodiment, the interaction layer can include a first signature input field at the first signature coordinate, a second signature input field at the second signature coordinate, a notarization input field at the notarization coordinate, or any combination thereof. In at least one embodiment, the interaction layer can be created at the processing location. In at least one embodiment, the interaction layer can include each page of the document. In at least one embodiment, an interaction layer can be created for each page of the document. In at least one embodiment, the method can include creating, at the processing location, an interaction layer for each page of the document, the interaction layer being separate from the base layer and the text layer, the interaction layer being translucent, the interaction layer including a first signature input field at the first signature coordinate, a second signature input field at the second signature coordinate, and a notarization input field at the notarization coordinate.

In at least one embodiment, the method can include assembling a processed document by overlaying the various layers. For example, the text layer can be layered over the base layer and/or the interaction layer layered over the text layer. In at least one embodiment, the assembling can be performed at the processing location. In at least one embodiment, the method can include assembling, at the processing location, a processed document by overlaying the text layer over the base layer, and overlaying the interaction layer over the text layer.

In at least one embodiment, the method can include communicating the processed document. In at least one embodiment, the processed document can be communicated from the processing location. In at least one embodiment, the processed document can be communicated to a first touchscreen computing device. In at least one embodiment, the processed document can be communicated to the signing agent's location. In at least one embodiment, the method can include communicating the processed document from the processing location to a first touchscreen computing device at the signing agent's location.

In at least one embodiment, the method can include assigning an execution device to each signer. In at least one embodiment, the method can include assigning a first execution device to the first signer. In at least one embodiment, assigning the first execution device to the first signer can configure the first execution device to interact with the first signature input field. In at least one embodiment, assigning the first execution device to the first signer can prevent the first execution device from interacting with the second signature input field and/or the notarization input field. In at least one embodiment, assigning the execution device(s) to the signer(s) can be performed at the signing agent's location. In at least one embodiment, the method can include assigning, at the signing agent's location, a first execution device to the first signer, thereby configuring the first execution device to interact with the first signature input field and preventing the first execution device from interacting with the second signature input field and the notarization input field.

In at least one embodiment, the method can include assigning a second execution device to the second signer. In at least one embodiment, assigning the second execution device to the second signer can configure the second execution device to interact with the second signature input field. In at least one embodiment, assigning the second execution device to the second signer can prevent the second execution device from interacting with the first signature input field and/or the notarization input field. In at least one embodiment, the method can include assigning, at the signing agent's location, a second execution device to the second signer, thereby configuring the second execution device to interact with the second signature input field and preventing the second execution device from interacting with the first signature input field and the notarization input field.

In at least one embodiment, the method can include receiving information from and/or about each signer. In at least one embodiment, the method can include receiving information from the first and/or second signer. In at least one embodiment, the information from the first and/or second signer can be received by and/or into the first touchscreen computing device. In at least one embodiment, the method can include receiving, into the first touchscreen computing device, first and/or second information from the first signer and/or second information from the second signer.

In at least one embodiment, the method can include populating the processed document with the information received from the signer(s). In at least one embodiment, the method can include populating the processed document with the first and/or second information. In at least one embodiment, populating the processed document with the information received from the signer(s) can be performed on or by the first touchscreen computing device. In at least one embodiment, the method can include populating, by the first touchscreen computing device, the processed document with the first and/or second information.

In at least one embodiment, the method can include monitoring each signer's progress through the processed document. In at least one embodiment, this monitoring can be performed on and/or by the first touchscreen computing device. In at least one embodiment, the method can include monitoring, on the first touchscreen computing device, the first and/or second signer's progress through the processed document.

In at least one embodiment, the method can include confirming each signer's completion of the processed document. In at least one embodiment, the method can include confirming the first and/or the second signer's completion of the processed document. In at least one embodiment, this confirming can be performed on and/or by the first touchscreen computing device. In at least one embodiment, the method can include confirming, on the first touchscreen computing device, the first signer's completion of the processed document.

In at least one embodiment, the method can include assigning another execution device to the signing agent. In at least one embodiment, the method can include assigning a third execution device to the signing agent. In at least one embodiment, assigning the execution device to the signing agent can configure that execution device to interact with the notarization input field. In at least one embodiment, assigning the execution device to the signing agent can prevent that execution device from interacting with the first signature input field and/or second signature input field. In at least one embodiment, assigning the execution device to the signing agent can be performed at the signing agent's location. In at least one embodiment, the method can include assigning, at the signing agent's location, a third execution device to the signing agent, thereby configuring the third execution device to interact with the notarization input field and preventing the third execution device from interacting with the first signature input field and second signature input field.

In at least one embodiment, the method can include receiving information from the signing agent. In at least one embodiment, the information from the signing agent can be received by and/or into the first touchscreen computing device. In at least one embodiment, the method can include receiving, into the first touchscreen computing device, third information from the signing agent.

In at least one embodiment, the method can include populating the processed document with the information from the signing agent. In at least one embodiment, the processed document can be populated with the information from the signing agent by the first touchscreen computing device. In at least one embodiment, the method can include populating, by the first touchscreen computing device, the processed document with the third information.

In at least one embodiment, the method can include monitoring the signing agent's progress through the processed document. In at least one embodiment, the method can include monitoring, on the first touchscreen computing device, the signing agent's progress through the processed document.

In at least one embodiment, the method can include confirming the signing agent's completion of the processed document. In at least one embodiment, the method can include confirming, on the first touchscreen computing device, the signing agent's completion of the processed document.

In at least one embodiment, the method can include creating a finalized document by preventing further modification of the base layer, the text layer, the interaction layer, or any combination thereof. In at least one embodiment, creating the finalized document can be performed at the processing location. In at least one embodiment, creating the finalized document can be performed on or by the first touchscreen computing device. In at least one embodiment, the method can include creating, at the processing location, a finalized document by preventing further modification of the base layer, the text layer, and the interaction layer.

In at least one embodiment, the method can include communicating the finalized document. In at least one embodiment, the method can include communicating the finalized document from the processing location. In at least one embodiment, the method can include communicating the finalized document to a recordation facility, such as for formal recordation of the finalized document. In at least one embodiment, the method can include communicating the finalized document from the processing location to a recordation facility for formal recordation of the finalized document.

In at least one embodiment, the first signer and the second signer can execute the processed document concurrently or simultaneously. In at least one embodiment, the first execution device can be physically distinct from the second execution device. In at least one embodiment, the first signer and the second signer can execute the processed document consecutively. In at least one embodiment, the first execution device can be the same physical device as the second execution device. In at least one embodiment, the first execution device can be first assigned as the first execution device and then later assigned as the second execution device. In at least one embodiment, the first execution device can be the same physical device as the second execution device, but is first assigned as the first execution device and then later assigned as the second execution device.

In at least one embodiment, any of the execution device(s) can be an electronic stylus coupled to a touchscreen computing device. In at least one embodiment, the first execution device can be an electronic stylus coupled to the first touchscreen computing device. In at least one embodiment, any of the execution device(s) can include another touchscreen computing device physically distinct from the first touchscreen computing device. In at least one embodiment, the first execution device can include a second touchscreen computing device physically distinct from the first touchscreen computing device. In at least one embodiment, the second execution device can include a third touchscreen computing device physically distinct from the first touchscreen computing device and the second touchscreen computing device. In at least one embodiment, the third execution device includes the first touchscreen computing device.

In at least one embodiment, monitoring a signer's progress through the processed document can include alerting the signing agent that the associated execution device attempted to interact with an input field associated with someone else. In at least one embodiment, monitoring the first signer's progress through the processed document can include alerting the signing agent that the first execution device attempted to interact with the second signature input field. In at least one embodiment, alerting the signing agent can be performed on and/or by the first touchscreen computing device. In at least one embodiment, alerting the signing agent can be performed on and/or by any of the execution device(s). In at least one embodiment, monitoring the first signer's progress through the processed document can include alerting the signing agent, on the first touchscreen computing device, that the first execution device attempted to interact with the second signature input field.

In at least one embodiment, the first signer and the second signer can execute the processed document at the signing agent's location. In at least one embodiment, the first signer can execute the processed document remotely from the second signer and/or the signing agent's location.

In at least one embodiment, the signature input field(s) can be depicted in the processed document using one or more colors. In at least one embodiment, the different signature input fields can be depicted in the processed document using different colors. In at least one embodiment, the first signature input field can be depicted in the processed document using a first color and the second signature input field is depicted in the processed document using a second color, wherein the first color and the second color are different.

In at least one embodiment, the method can include verifying an identity of each signer. In at least one embodiment, the verifying can be performed by the signing agent. In at least one embodiment, the method can include verifying, by the signing agent, an identity of the first and/or second signer.

In at least one embodiment, the method can include affixing a notary seal to the processed document after the signer(s) have executed the processed document. In at least one embodiment, the method can include affixing a notary seal to the processed document after the first and/or second signer has executed the processed document.

In at least one embodiment, identifying the template can be based, at least in part, on previous analysis of a previous document of the same type as the received document. In at least one embodiment, identifying the template can be based, at least in part, on previous analysis of a previous document from the same source as the received document.

In at least one embodiment, the originating agent can be the signing agent. In at least one embodiment, the originating agent can be a different person from the signing agent. In at least one embodiment, the originating agent can be a different person from the first signer and second signer. In at least one embodiment, the signing agent can be a different person from the first signer and second signer. In at least one embodiment, the signing agent can be the first signer and/or second signer. In at least one embodiment, one person may fulfill multiple roles.

In at least one embodiment, a method of managing document execution can include receiving an electronic document; receiving origination information about the electronic document; performing an optical character recognition the electronic document to recognize text characters and their coordinates; identifying one or more signature coordinate(s) of one or more signature element (s) in the electronic document; identifying at least one notarization coordinate of a notarization element in the electronic document; creating a base layer including each page of the received document; creating an interaction layer including a signature input field at each signature coordinate and a notarization input field at the notarization coordinate; assembling a processed document by overlaying the interaction layer over the base layer; communicating the processed document to a first touchscreen computing device; verifying an identity of the signer(s); assigning an execution device to each signer; receiving information from the signer(s); populating the processed document with that information; monitoring the progress of each signer through the processed document; receiving each signer's signature in the appropriate signature input field; confirming each signer's completion of the processed document; receiving notarization information from the signing agent; populating the processed document with the notarization information; receiving the signing agent's notarization in the notarization input field; creating a finalized document by preventing further modification of the interaction layer; and communicating the finalized document to a recordation facility for formal recordation of the finalized document.

In at least one embodiment, the electronic document can be received at a processing location and/or from an originating agent. In at least one embodiment, the origination information can be received at a processing location and/or from an originating agent. In at least one embodiment, the optical character recognition can be performed at the processing location and/or on each page of the electronic document.

In at least one embodiment, the signature coordinate identification can be performed at the processing location and/or with reference to the origination information. In at least one embodiment, each signature element can correspond to a different signer. In at least one embodiment, multiple signature elements can correspond to a single signer. In at least one embodiment, a first signature element can correspond to a first signer and/or a second signature element can correspond to a second signer. In at least one embodiment, identifying the notarization coordinate can be performed at the processing location and/or with reference to the origination information. In at least one embodiment, the notarization element can correspond to a signing agent.

In at least one embodiment, creating the base layer can be performed at the processing location. In at least one embodiment, a base layer can be created for each page of the document. In at least one embodiment, the base layer can include each page of the document. In at least one embodiment, creating the interaction layer can be performed at the processing location. In at least one embodiment, an interaction layer can be created for each page of the document. In at least one embodiment, the interaction layer can include each page of the document. In at least one embodiment, the interaction layer can be separate from the base layer. In at least one embodiment, the interaction layer can be translucent. In at least one embodiment, the interaction layer can include a signature input field at each signature coordinate and/or a notarization input field at the notarization coordinate.

In at least one embodiment, the processed document can be assembled at the processing location. In at least one embodiment, the processed document can be communicated from the processing location. In at least one embodiment, the processed document can be communicated to a touchscreen computing device.

In at least one embodiment, the signing agent can verify the identity of the signer(s). In at least one embodiment, the signing agent can assign the execution device(s) to each signer. In at least one embodiment, assigning the execution device(s) to each signer can configure the execution device to interact with an appropriate signature input field and/or prevent that execution device from interacting with an inappropriate input field. In at least one embodiment, assigning the first execution device to the first signer can configure the execution device to interact with the first signature input field and preventing the first execution device from interacting with the notarization input field.

In at least one embodiment, receiving the information from the first signer can be performed by and/or into the first touchscreen computing device. In at least one embodiment, populating the processed document with the first information can be performed on and/or by the first touchscreen computing device. In at least one embodiment, monitoring the first signer's progress through the processed document can be performed on and/or by the first touchscreen computing device. In at least one embodiment, receiving the first signer's signature in the first signature input field can be performed on and/or by the first touchscreen computing device. In at least one embodiment, confirming the first signer's completion of the processed document can be performed on and/or by the first touchscreen computing device.

In at least one embodiment, assigning a second execution device to the signing agent can be performed by the signing agent. In at least one embodiment, assigning the second execution device to the signing agent can configure the second execution device to interact with the notarization input field. In at least one embodiment, assigning the second execution device to the signing agent can prevent the second execution device from interacting with the first signature input field.

In at least one embodiment, receiving notarization information from the signing agent can be performed by and/or into the first touchscreen computing device. In at least one embodiment, populating the processed document with the notarization information can be performed on and/or by the first touchscreen computing device. In at least one embodiment, receiving the signing agent's notarization in the notarization input field can be performed on and/or by the first touchscreen computing device. In at least one embodiment, creating the finalized document can be performed on and/or by the first touchscreen computing device. In at least one embodiment, creating the finalized document can be performed remotely from the first touchscreen computing device, such as at a processing location. In at least one embodiment, the finalized document can be communicated, for formal recordation of the finalized document, from the first touchscreen computing device or a processing location.

DETAILED DESCRIPTION OF THE INVENTION

Figure 1:
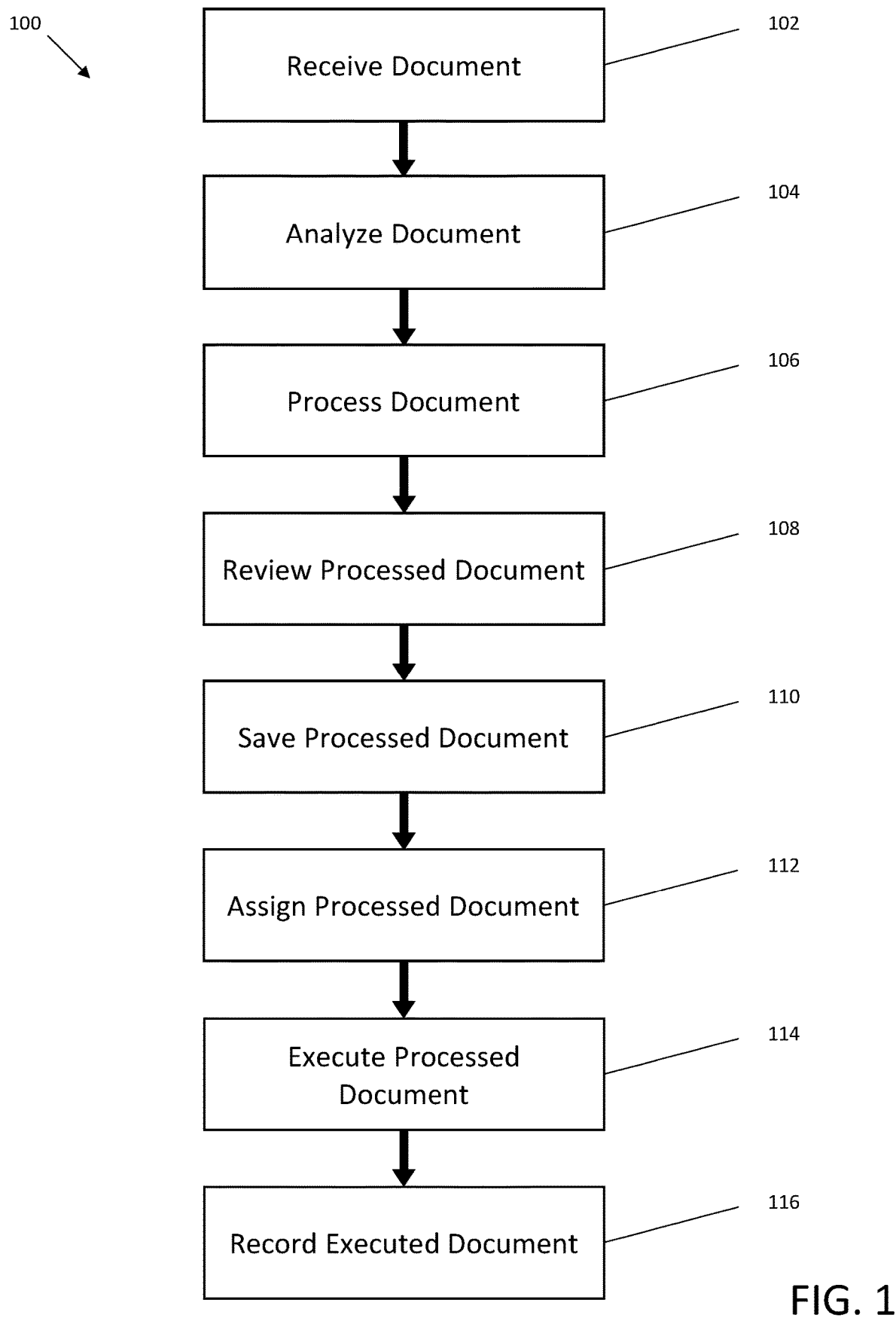
FIG. 1 is a flow chart showing one of many embodiments of a document processing method according to the disclosure.

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms.

The use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the inventions or the appended claims. The terms "including" and "such as" are illustrative and not limitative. The terms "couple," "coupled," "coupling," "coupler," and like terms are used broadly herein and can include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and can further include without limitation integrally forming one functional member with another in a unity fashion. The coupling can occur in any direction, including rotationally. Further, all parts and components of the disclosure that are capable of being physically embodied inherently include imaginary and real characteristics regardless of whether such characteristics are expressly described herein, including but not limited to characteristics such as axes, ends, inner and outer surfaces, interior spaces, tops, bottoms, sides, boundaries, dimensions (e.g., height, length, width, thickness), mass, weight, volume and density, among others.

Process flowcharts discussed herein illustrate the operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some implementations, the functions noted in the blocks might occur, iteratively and/or out of the order depicted in the figures. For example, blocks shown in succession may, in fact, be executed substantially concurrently. It will also be noted that each block of flowchart illustration can be implemented by special purpose hardware-based systems that perform the specified functions or acts, or combinations of special purpose hardware and computer instructions. Of course, in specific implementations of the present inventions, any of the functions depicted in the figures can be omitted, combined, or otherwise modified.

Applicants have created new and useful devices, systems and methods for journaling the notarization of a document execution.

In at least one embodiment, a method of managing document execution can include receiving a document; analyzing and/or processing the document; communicating the processed document; assigning one or more execution devices for use with the document; monitoring execution of the document; notarizing the document; finalizing the document; recording the document; or any combination thereof.

In at least one embodiment, analyzing and/or processing the document can include identifying a template for the document; performing an optical character recognition on the document; identifying one or more signature elements in the document; identifying a notarization element in the document; or any combination thereof. In at least one embodiment, analyzing and/or processing the document can include creating a base layer including the document; creating a text layer including the text recognized the document; creating an interaction layer including input fields for the elements recognized from the document; assembling the layers; or any combination thereof.

In at least one embodiment, the method can include receiving a received document from an originating agent. In at least one embodiment, the document can be received in PDF format and/or comprise one or more pages. In at least one embodiment, the document can be received at a processing location. In at least one embodiment, the document can be received from a computer system of an originating agent, such as at an originating agent location. In at least one embodiment, the method can include receiving, at a processing location, a received document in PDF format from a computer system of an originating agent at an originating agent location, the received document comprising one or more pages.

In at least one embodiment, the method can include receiving origination information about the document. In at least one embodiment, the method can include receiving, at the processing location, origination information about the received document from the originating agent.

In at least one embodiment, the method can include identifying a template identified by analysis of the information and/or the received document. In at least one embodiment, the template can be identified and/or saved in a repository at the processing location. In at least one embodiment, the method can include identifying, at the processing location, a template saved in a repository at the processing location, wherein the template is identified by analysis of the information and the received document.

In at least one embodiment, the method can include performing an optical character recognition (OCR) of document. In at least one embodiment, the OCR can be performed on any or all of the pages of the document. In at least one embodiment, the OCR can recognize text characters and their coordinates in the document. In at least one embodiment, the OCR can be performed at the processing location. In at least one embodiment, the method can include performing, at the processing location, an optical character recognition of each page of the received document to recognize text characters and their coordinates on each page of the received document.

In at least one embodiment, the method can include identifying one or more signature elements in the received document. In at least one embodiment, the method can include identifying a first signature coordinate of a first signature element corresponding to a first signer and a second signature coordinate of a second signature element corresponding to a second signer. In at least one embodiment, the first signer and the second signer can be the same or different people. In at least one embodiment, identifying the signature element(s) can be performed at the processing location and/or with reference to the template. In at least one embodiment, the method can include identifying, at the processing location with reference to the template, at least two signature elements in the received document including a first signature coordinate of a first signature element corresponding to a first signer and a second signature coordinate of a second signature element corresponding to a second signer, wherein the first signer and the second signer are different people.

In at least one embodiment, the method can include identifying at least one notarization coordinate of a notarization element in the received document. In at least one embodiment, the notarization element can correspond to a signing agent. In at least one embodiment, identifying the notarization coordinate(s) can be performed at the processing location and/or with reference to the template. In at least one embodiment, the method can include identifying, at the processing location with reference to the template, at least one notarization coordinate of a notarization element in the received document, the notarization element corresponding to a signing agent.

In at least one embodiment, the method can include creating a base layer for the document. In at least one embodiment, the base layer can include each page of the received document. In at least one embodiment, a base layer can be created for each page of the received document. In at least one embodiment, a base layer can be created at the processing location. In at least one embodiment, the method can include creating, at the processing location, a base layer for each page of the document, the base layer including each page of the received document.

In at least one embodiment, the method can include creating a text layer. In at least one embodiment, the text layer can be separate from the base layer and/or include the text recognized from each page of the received document. In at least one embodiment, the text layer can include each page of the received document. In at least one embodiment, a text layer can be created for each page of the received document. In at least one embodiment, a text layer can be created at the processing location. In at least one embodiment, the method can include creating, at the processing location, a text layer for each page of the document, the text layer being separate from the base layer and including the text recognized from each page of the received document.

In at least one embodiment, the method can include creating an interaction layer the document. In at least one embodiment, the interaction layer can be separate from the base layer and/or the text layer. In at least one embodiment, the interaction layer can be translucent. In at least one embodiment, the interaction layer can include a first signature input field at the first signature coordinate, a second signature input field at the second signature coordinate, a notarization input field at the notarization coordinate, or any combination thereof. In at least one embodiment, the interaction layer can be created at the processing location. In at least one embodiment, the interaction layer can include each page of the document. In at least one embodiment, an interaction layer can be created for each page of the document. In at least one embodiment, the method can include creating, at the processing location, an interaction layer for each page of the document, the interaction layer being separate from the base layer and the text layer, the interaction layer being translucent, the interaction layer including a first signature input field at the first signature coordinate, a second signature input field at the second signature coordinate, and a notarization input field at the notarization coordinate.

In at least one embodiment, the method can include assembling a processed document by overlaying the various layers. For example, the text layer can be layered over the base layer and/or the interaction layer layered over the text layer. In at least one embodiment, the assembling can be performed at the processing location. In at least one embodiment, the method can include assembling, at the processing location, a processed document by overlaying the text layer over the base layer, and overlaying the interaction layer over the text layer.

In at least one embodiment, the method can include communicating the processed document. In at least one embodiment, the processed document can be communicated from the processing location. In at least one embodiment, the processed document can be communicated to a first touchscreen computing device. In at least one embodiment, the processed document can be communicated to the signing agent's location. In at least one embodiment, the method can include communicating the processed document from the processing location to a first touchscreen computing device at the signing agent's location.

In at least one embodiment, the method can include assigning an execution device to each signer. In at least one embodiment, the method can include assigning a first execution device to the first signer. In at least one embodiment, assigning the first execution device to the first signer can configure the first execution device to interact with the first signature input field. In at least one embodiment, assigning the first execution device to the first signer can prevent the first execution device from interacting with the second signature input field and/or the notarization input field. In at least one embodiment, assigning the execution device(s) to the signer(s) can be performed at the signing agent's location. In at least one embodiment, the method can include assigning, at the signing agent's location, a first execution device to the first signer, thereby configuring the first execution device to interact with the first signature input field and preventing the first execution device from interacting with the second signature input field and the notarization input field.

In at least one embodiment, the method can include assigning a second execution device to the second signer. In at least one embodiment, assigning the second execution device to the second signer can configure the second execution device to interact with the second signature input field. In at least one embodiment, assigning the second execution device to the second signer can prevent the second execution device from interacting with the first signature input field and/or the notarization input field. In at least one embodiment, the method can include assigning, at the signing agent's location, a second execution device to the second signer, thereby configuring the second execution device to interact with the second signature input field and preventing the second execution device from interacting with the first signature input field and the notarization input field.

In at least one embodiment, the method can include receiving information from and/or about each signer. In at least one embodiment, the method can include receiving information from the first and/or second signer. In at least one embodiment, the information from the first and/or second signer can be received by and/or into the first touchscreen computing device. In at least one embodiment, the method can include receiving, into the first touchscreen computing device, first and/or second information from the first signer and/or second information from the second signer.

In at least one embodiment, the method can include populating the processed document with the information received from the signer(s). In at least one embodiment, the method can include populating the processed document with the first and/or second information. In at least one embodiment, populating the processed document with the information received from the signer(s) can be performed on or by the first touchscreen computing device. In at least one embodiment, the method can include populating, by the first touchscreen computing device, the processed document with the first and/or second information.

In at least one embodiment, the method can include monitoring each signer's progress through the processed document. In at least one embodiment, this monitoring can be performed on and/or by the first touchscreen computing device. In at least one embodiment, the method can include monitoring, on the first touchscreen computing device, the first and/or second signer's progress through the processed document.

In at least one embodiment, the method can include confirming each signer's completion of the processed document. In at least one embodiment, the method can include confirming the first and/or the second signer's completion of the processed document. In at least one embodiment, this confirming can be performed on and/or by the first touchscreen computing device. In at least one embodiment, the method can include confirming, on the first touchscreen computing device, the first signer's completion of the processed document.

In at least one embodiment, the method can include assigning another execution device to the signing agent. In at least one embodiment, the method can include assigning a third execution device to the signing agent. In at least one embodiment, assigning the execution device to the signing agent can configure that execution device to interact with the notarization input field. In at least one embodiment, assigning the execution device to the signing agent can prevent that execution device from interacting with the first signature input field and/or second signature input field. In at least one embodiment, assigning the execution device to the signing agent can be performed at the signing agent's location. In at least one embodiment, the method can include assigning, at the signing agent's location, a third execution device to the signing agent, thereby configuring the third execution device to interact with the notarization input field and preventing the third execution device from interacting with the first signature input field and second signature input field.

In at least one embodiment, the method can include receiving information from the signing agent. In at least one embodiment, the information from the signing agent can be received by and/or into the first touchscreen computing device. In at least one embodiment, the method can include receiving, into the first touchscreen computing device, third information from the signing agent.

In at least one embodiment, the method can include populating the processed document with the information from the signing agent. In at least one embodiment, the processed document can be populated with the information from the signing agent by the first touchscreen computing device. In at least one embodiment, the method can include populating, by the first touchscreen computing device, the processed document with the third information.

In at least one embodiment, the method can include monitoring the signing agent's progress through the processed document. In at least one embodiment, the method can include monitoring, on the first touchscreen computing device, the signing agent's progress through the processed document.

In at least one embodiment, the method can include confirming the signing agent's completion of the processed document. In at least one embodiment, the method can include confirming, on the first touchscreen computing device, the signing agent's completion of the processed document.

In at least one embodiment, the method can include creating a finalized document by preventing further modification of the base layer, the text layer, the interaction layer, or any combination thereof. In at least one embodiment, creating the finalized document can be performed at the processing location. In at least one embodiment, creating the finalized document can be performed on or by the first touchscreen computing device. In at least one embodiment, the method can include creating, at the processing location, a finalized document by preventing further modification of the base layer, the text layer, and the interaction layer.

In at least one embodiment, the method can include communicating the finalized document. In at least one embodiment, the method can include communicating the finalized document from the processing location. In at least one embodiment, the method can include communicating the finalized document to a recordation facility, such as for formal recordation of the finalized document. In at least one embodiment, the method can include communicating the finalized document from the processing location to a recordation facility for formal recordation of the finalized document.

In at least one embodiment, the first signer and the second signer can execute the processed document concurrently or simultaneously. In at least one embodiment, the first execution device can be physically distinct from the second execution device. In at least one embodiment, the first signer and the second signer can execute the processed document consecutively. In at least one embodiment, the first execution device can be the same physical device as the second execution device. In at least one embodiment, the first execution device can be first assigned as the first execution device and then later assigned as the second execution device. In at least one embodiment, the first execution device can be the same physical device as the second execution device, but is first assigned as the first execution device and then later assigned as the second execution device.

In at least one embodiment, any of the execution device(s) can be an electronic stylus coupled to a touchscreen computing device. In at least one embodiment, the first execution device can be an electronic stylus coupled to the first touchscreen computing device. In at least one embodiment, any of the execution device(s) can include another touchscreen computing device physically distinct from the first touchscreen computing device. In at least one embodiment, the first execution device can include a second touchscreen computing device physically distinct from the first touchscreen computing device. In at least one embodiment, the second execution device can include a third touchscreen computing device physically distinct from the first touchscreen computing device and the second touchscreen computing device. In at least one embodiment, the third execution device includes the first touchscreen computing device.

In at least one embodiment, monitoring a signer's progress through the processed document can include alerting the signing agent that the associated execution device attempted to interact with an input field associated with someone else. In at least one embodiment, monitoring the first signer's progress through the processed document can include alerting the signing agent that the first execution device attempted to interact with the second signature input field. In at least one embodiment, alerting the signing agent can be performed on and/or by the first touchscreen computing device. In at least one embodiment, alerting the signing agent can be performed on and/or by any of the execution device(s). In at least one embodiment, monitoring the first signer's progress through the processed document can include alerting the signing agent, on the first touchscreen computing device, that the first execution device attempted to interact with the second signature input field.

In at least one embodiment, the first signer and the second signer can execute the processed document at the signing agent's location. In at least one embodiment, the first signer can execute the processed document remotely from the second signer and/or the signing agent's location.

In at least one embodiment, the signature input field(s) can be depicted in the processed document using one or more colors. In at least one embodiment, the different signature input fields can be depicted in the processed document using different colors. In at least one embodiment, the first signature input field can be depicted in the processed document using a first color and the second signature input field is depicted in the processed document using a second color, wherein the first color and the second color are different.

In at least one embodiment, the method can include verifying an identity of each signer. In at least one embodiment, the verifying can be performed by the signing agent. In at least one embodiment, the method can include verifying, by the signing agent, an identity of the first and/or second signer.

In at least one embodiment, the method can include affixing a notary seal to the processed document after the signer(s) have executed the processed document. In at least one embodiment, the method can include affixing a notary seal to the processed document after the first and/or second signer has executed the processed document.

In at least one embodiment, identifying the template can be based, at least in part, on previous analysis of a previous document of the same type as the received document. In at least one embodiment, identifying the template can be based, at least in part, on previous analysis of a previous document from the same source as the received document.

In at least one embodiment, the originating agent can be the signing agent. In at least one embodiment, the originating agent can be a different person from the signing agent. In at least one embodiment, the originating agent can be a different person from the first signer and second signer. In at least one embodiment, the signing agent can be a different person from the first signer and second signer. In at least one embodiment, the signing agent can be the first signer and/or second signer. In at least one embodiment, one person may fulfill multiple roles.

In at least one embodiment, a method of managing document execution can include receiving an electronic document; receiving origination information about the electronic document; performing an optical character recognition the electronic document to recognize text characters and their coordinates; identifying one or more signature coordinate(s) of one or more signature element (s) in the electronic document; identifying at least one notarization coordinate of a notarization element in the electronic document; creating a base layer including each page of the received document; creating an interaction layer including a signature input field at each signature coordinate and a notarization input field at the notarization coordinate; assembling a processed document by overlaying the interaction layer over the base layer; communicating the processed document to a first touchscreen computing device; verifying an identity of the signer(s); assigning an execution device to each signer; receiving information from the signer(s); populating the processed document with that information; monitoring the progress of each signer through the processed document; receiving each signer's signature in the appropriate signature input field; confirming each signer's completion of the processed document; receiving notarization information from the signing agent; populating the processed document with the notarization information; receiving the signing agent's notarization in the notarization input field; creating a finalized document by preventing further modification of the interaction layer; and communicating the finalized document to a recordation facility for formal recordation of the finalized document.

In at least one embodiment, the electronic document can be received at a processing location and/or from an originating agent. In at least one embodiment, the origination information can be received at a processing location and/or from an originating agent. In at least one embodiment, the optical character recognition can be performed at the processing location and/or on each page of the electronic document.

In at least one embodiment, the signature coordinate identification can be performed at the processing location and/or with reference to the origination information. In at least one embodiment, each signature element can correspond to a different signer. In at least one embodiment, multiple signature elements can correspond to a single signer. In at least one embodiment, a first signature element can correspond to a first signer and/or a second signature element can correspond to a second signer. In at least one embodiment, identifying the notarization coordinate can be performed at the processing location and/or with reference to the origination information. In at least one embodiment, the notarization element can correspond to a signing agent.

In at least one embodiment, creating the base layer can be performed at the processing location. In at least one embodiment, a base layer can be created for each page of the document. In at least one embodiment, the base layer can include each page of the document. In at least one embodiment, creating the interaction layer can be performed at the processing location. In at least one embodiment, an interaction layer can be created for each page of the document. In at least one embodiment, the interaction layer can include each page of the document. In at least one embodiment, the interaction layer can be separate from the base layer. In at least one embodiment, the interaction layer can be translucent. In at least one embodiment, the interaction layer can include a signature input field at each signature coordinate and/or a notarization input field at the notarization coordinate.

In at least one embodiment, the processed document can be assembled at the processing location. In at least one embodiment, the processed document can be communicated from the processing location. In at least one embodiment, the processed document can be communicated to a touchscreen computing device.

In at least one embodiment, the signing agent can verify the identity of the signer(s). In at least one embodiment, the signing agent can assign the execution device(s) to each signer. In at least one embodiment, assigning the execution device(s) to each signer can configure the execution device to interact with an appropriate signature input field and/or prevent that execution device from interacting with an inappropriate input field. In at least one embodiment, assigning the first execution device to the first signer can configure the execution device to interact with the first signature input field and preventing the first execution device from interacting with the notarization input field.

In at least one embodiment, receiving the information from the first signer can be performed by and/or into the first touchscreen computing device. In at least one embodiment, populating the processed document with the first information can be performed on and/or by the first touchscreen computing device. In at least one embodiment, monitoring the first signer's progress through the processed document can be performed on and/or by the first touchscreen computing device. In at least one embodiment, receiving the first signer's signature in the first signature input field can be performed on and/or by the first touchscreen computing device. In at least one embodiment, confirming the first signer's completion of the processed document can be performed on and/or by the first touchscreen computing device.

In at least one embodiment, assigning a second execution device to the signing agent can be performed by the signing agent. In at least one embodiment, assigning the second execution device to the signing agent can configure the second execution device to interact with the notarization input field. In at least one embodiment, assigning the second execution device to the signing agent can prevent the second execution device from interacting with the first signature input field.

In at least one embodiment, receiving notarization information from the signing agent can be performed by and/or into the first touchscreen computing device. In at least one embodiment, populating the processed document with the notarization information can be performed on and/or by the first touchscreen computing device. In at least one embodiment, receiving the signing agent's notarization in the notarization input field can be performed on and/or by the first touchscreen computing device. In at least one embodiment, creating the finalized document can be performed on and/or by the first touchscreen computing device. In at least one embodiment, creating the finalized document can be performed remotely from the first touchscreen computing device, such as at a processing location. In at least one embodiment, the finalized document can be communicated, for formal recordation of the finalized document, from the first touchscreen computing device or a processing location.

Figure 2:
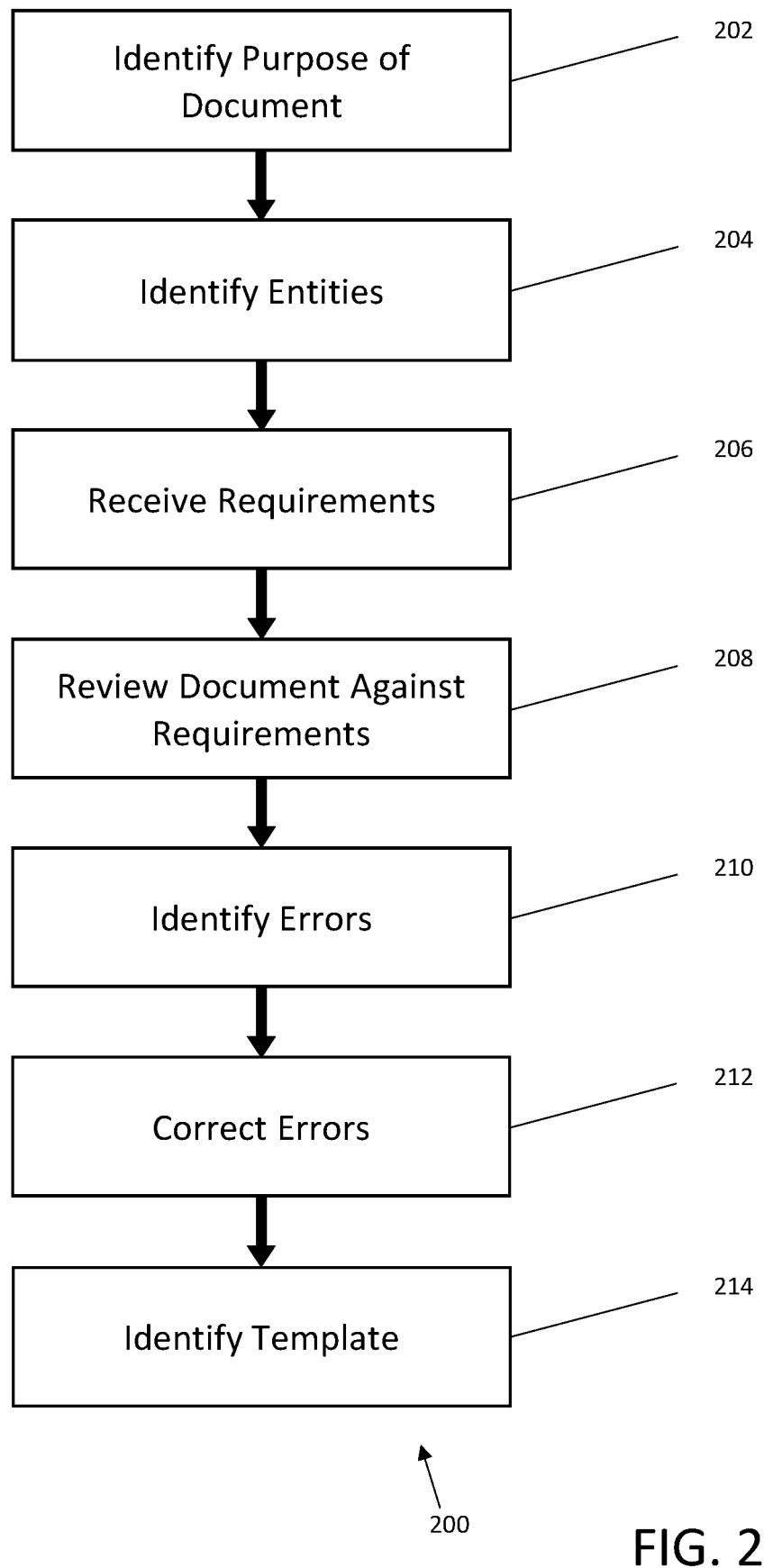
FIG. 2 is a flow chart showing one of many embodiments of a portion of a document processing method according to the disclosure.
Figure 3:
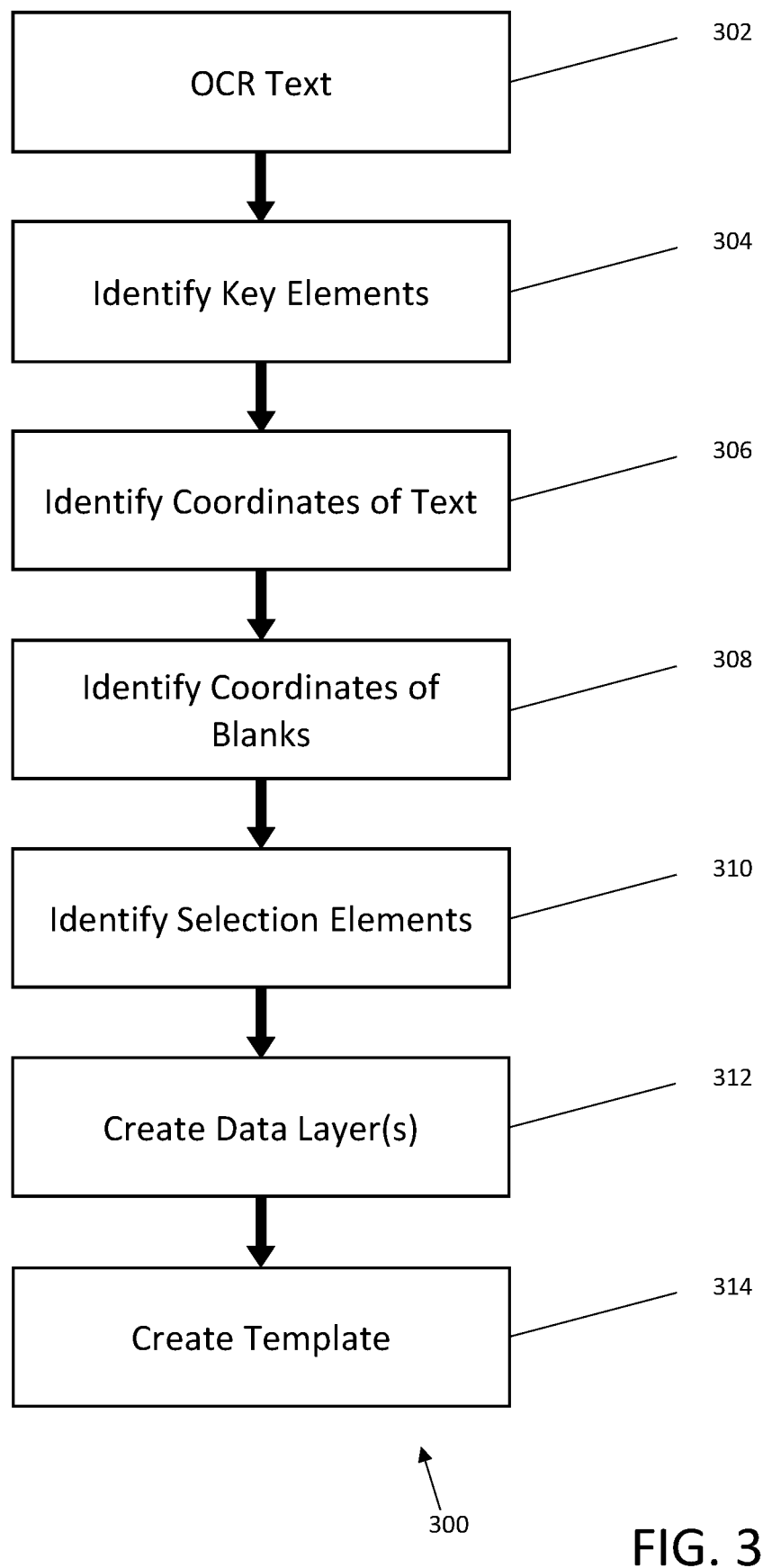
FIG. 3 is a flow chart showing one of many embodiments of another portion of a document processing method according to the disclosure.
Figure 4:
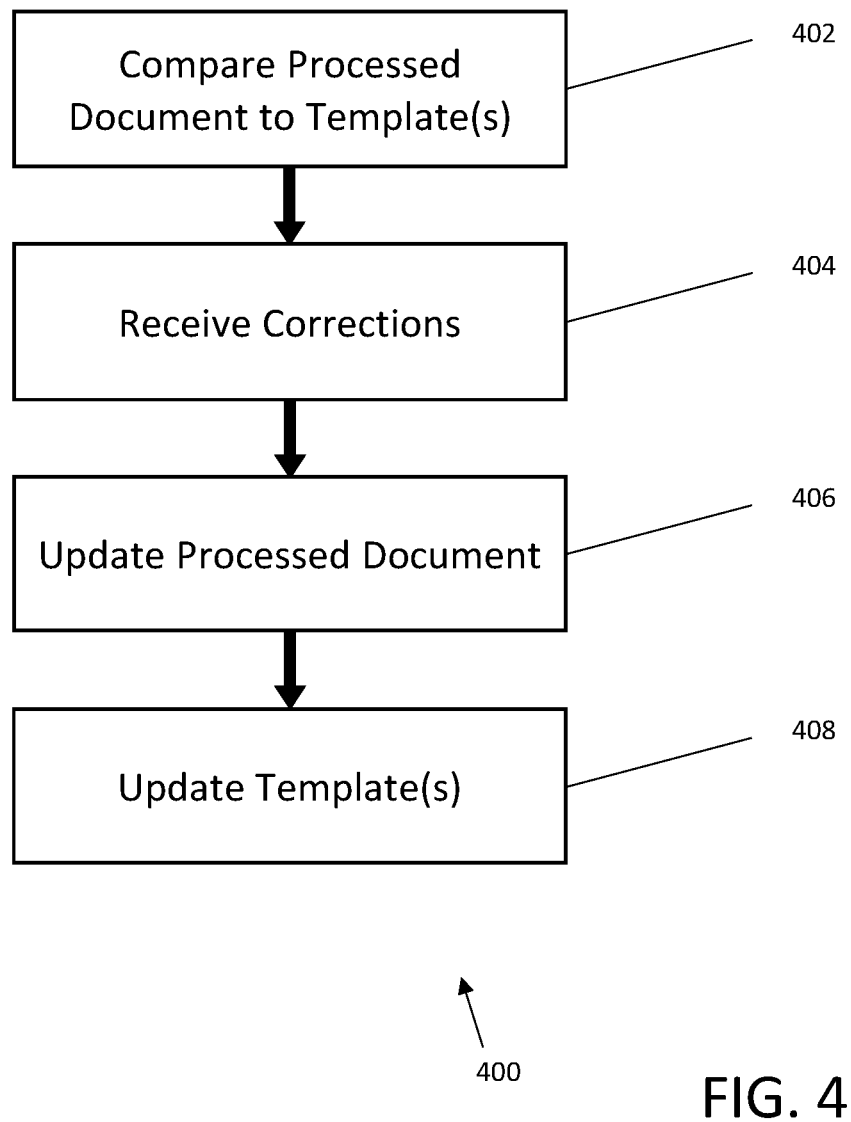
FIG. 4 is a flow chart showing one of many embodiments of yet another portion of a document processing method according to the disclosure.
Figure 5:
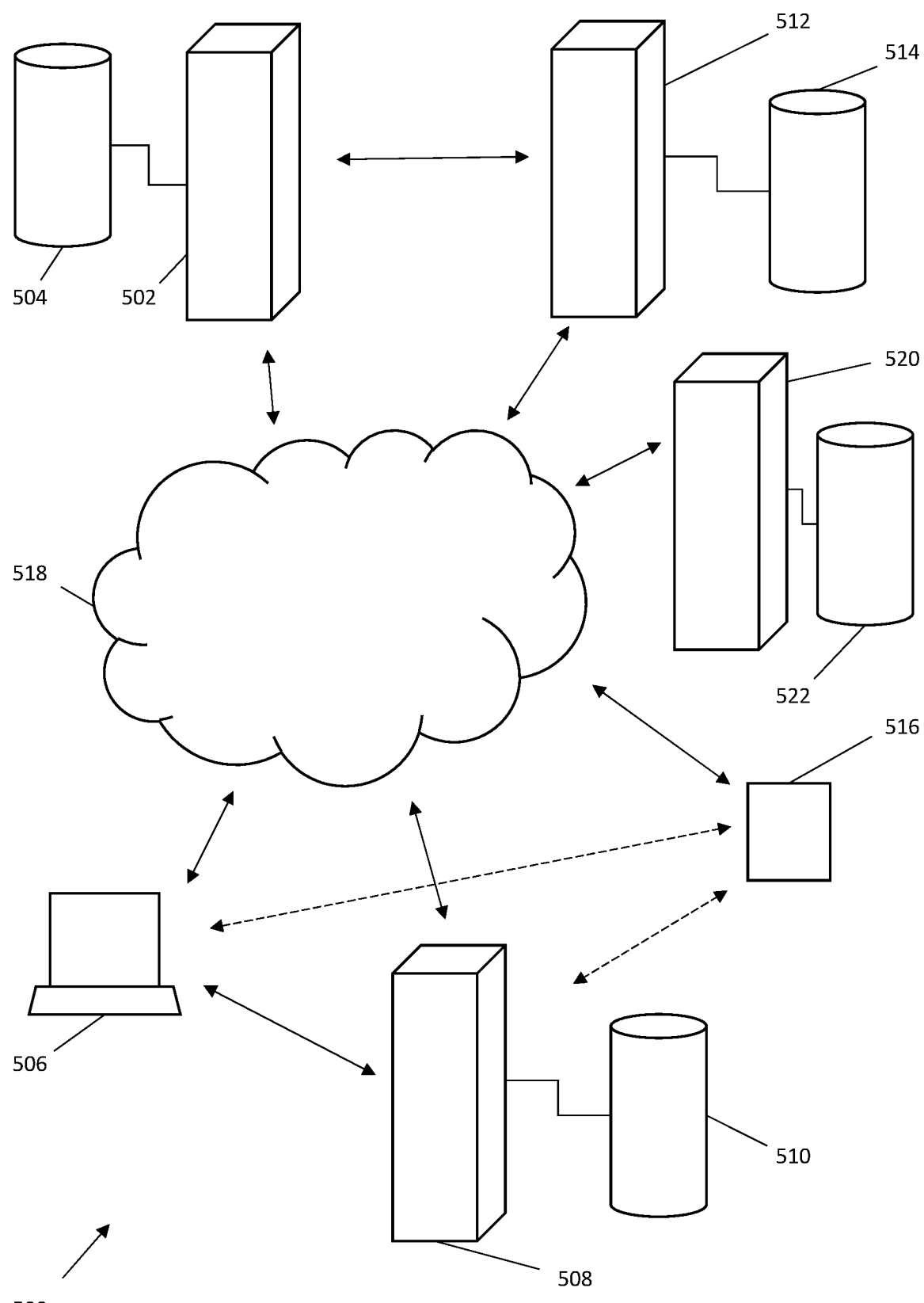
FIG. 5 is a block diagram of one embodiment of a computing environment that can be utilized with the present inventions according to the disclosure.
Figure 6:
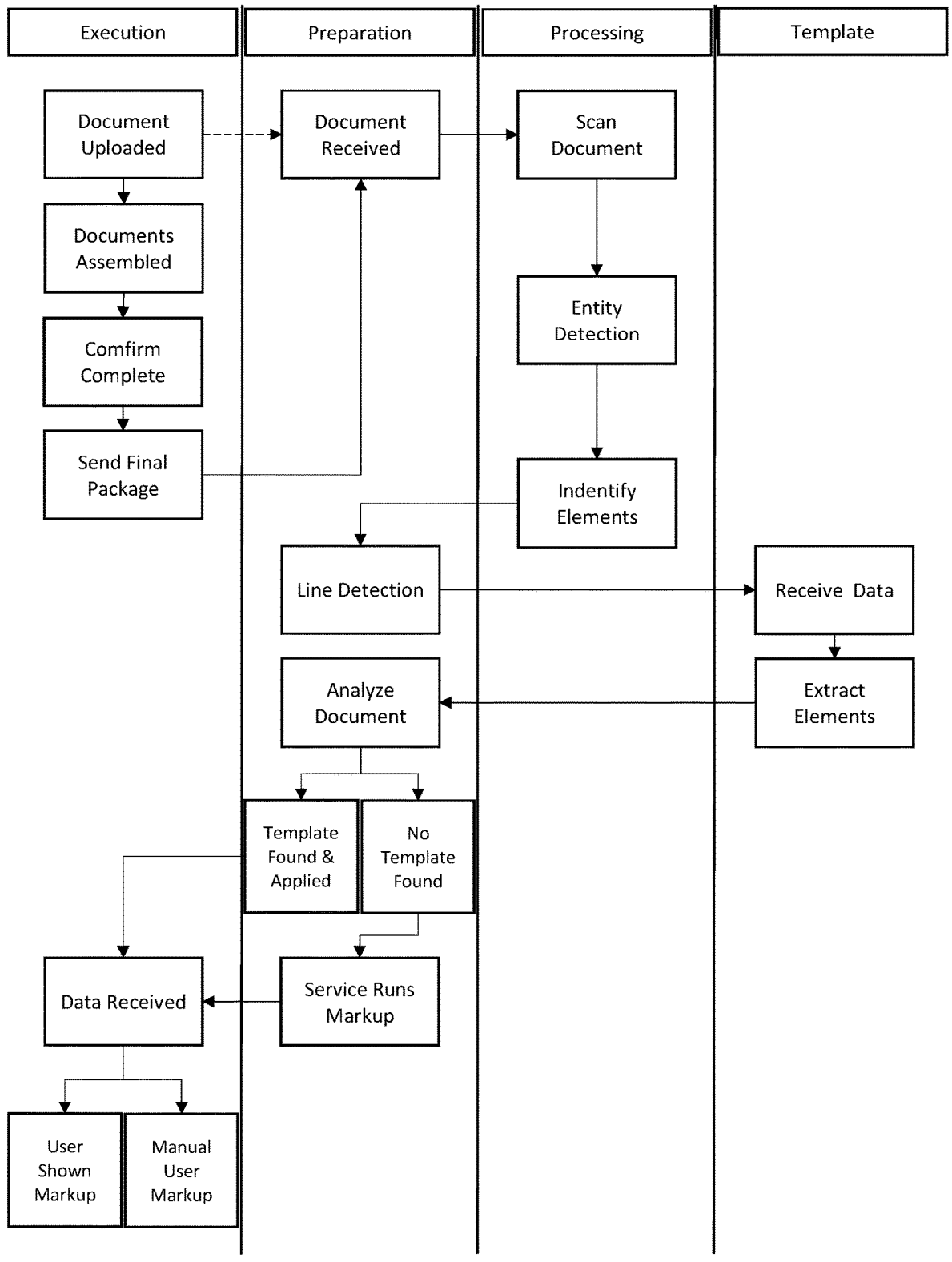
FIG. 6 is a flow chart showing another one of many embodiments of a document processing method according to the disclosure.
Figure 7:
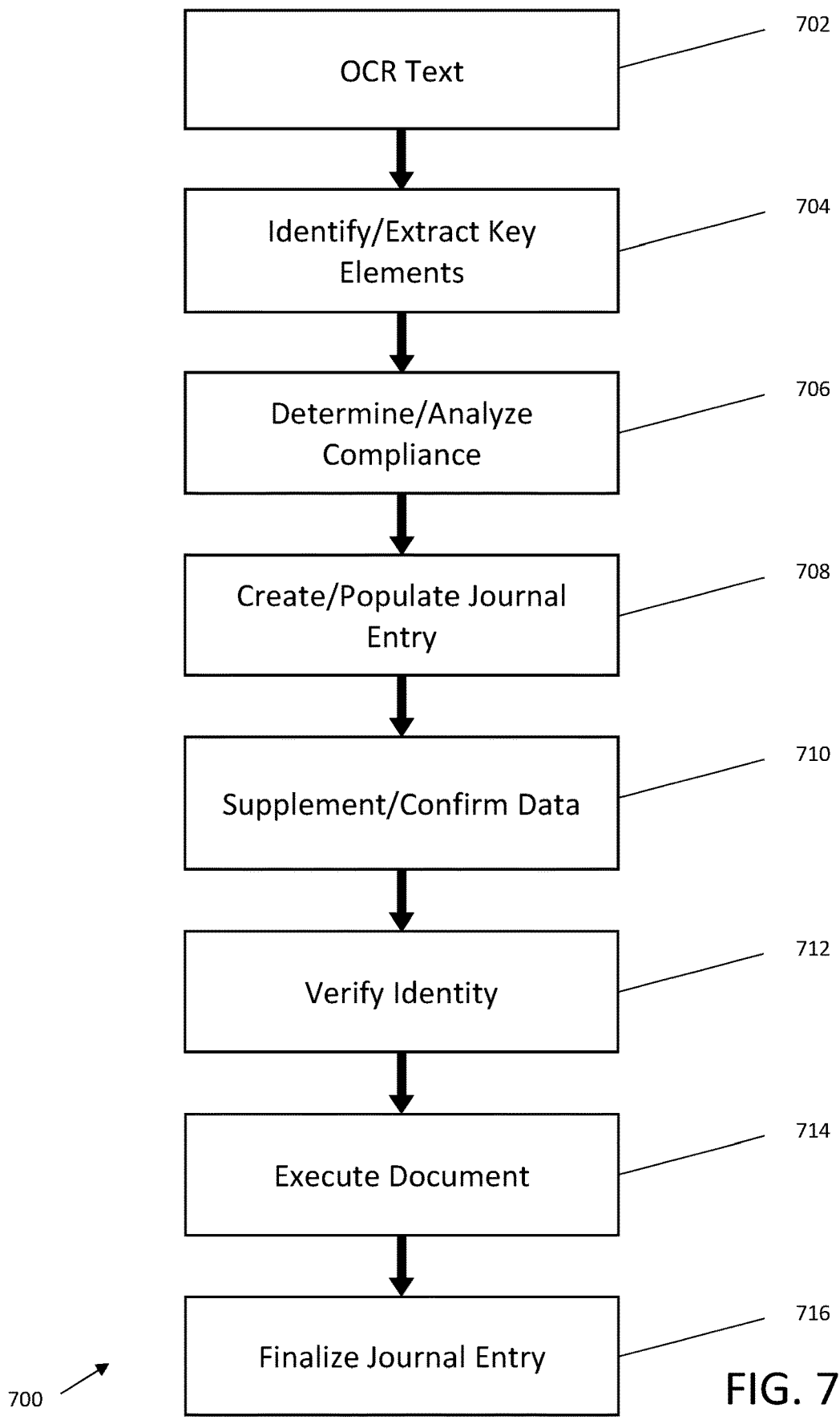
FIG. 7 is a flow chart showing another one of many embodiments of a method for journaling the notarization of a document execution according to the disclosure.
Figure 8:
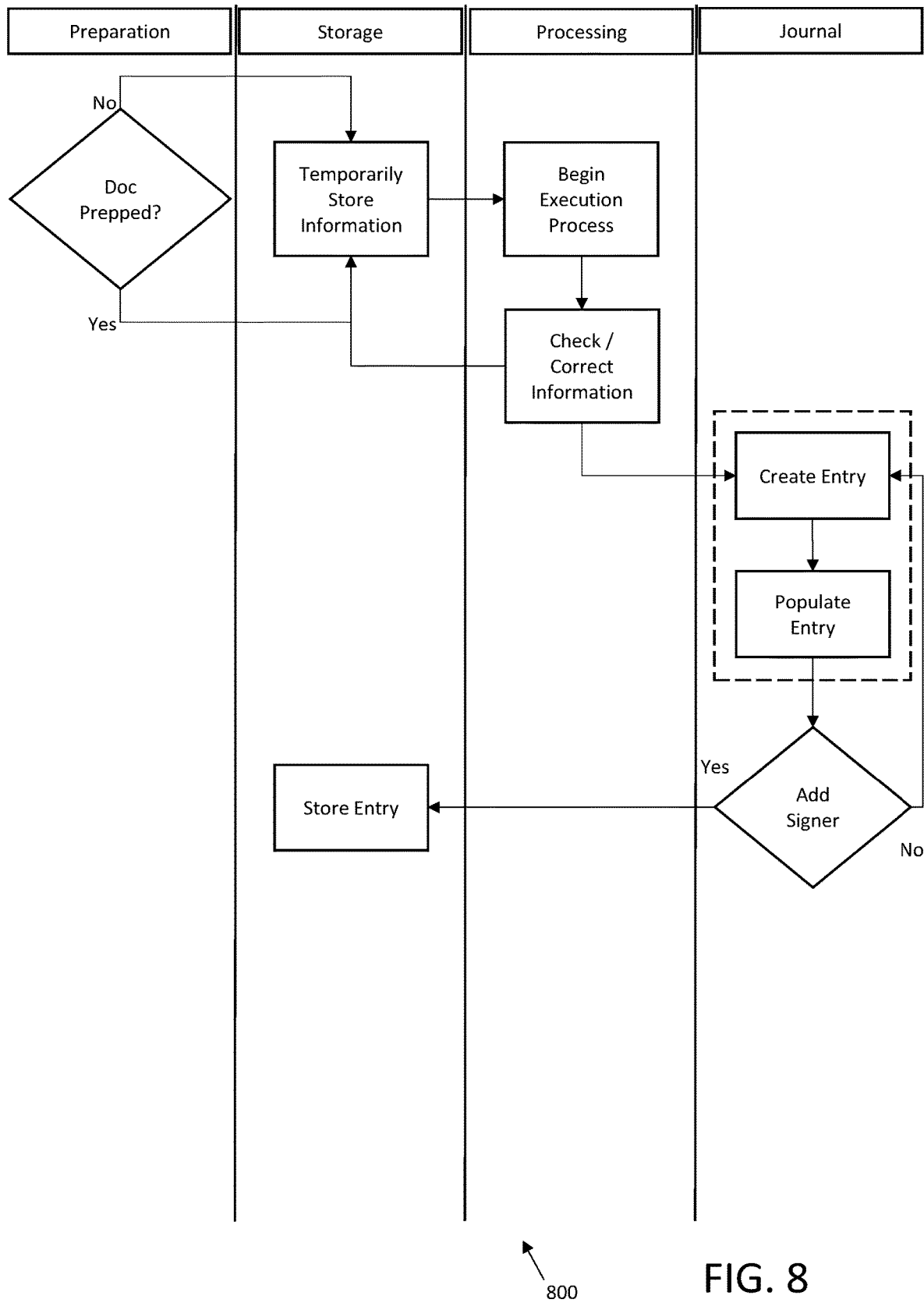
FIG. 8 is a flow chart showing another one of many embodiments of a method for journaling the notarization of a document execution according to the disclosure.
Figure 9:
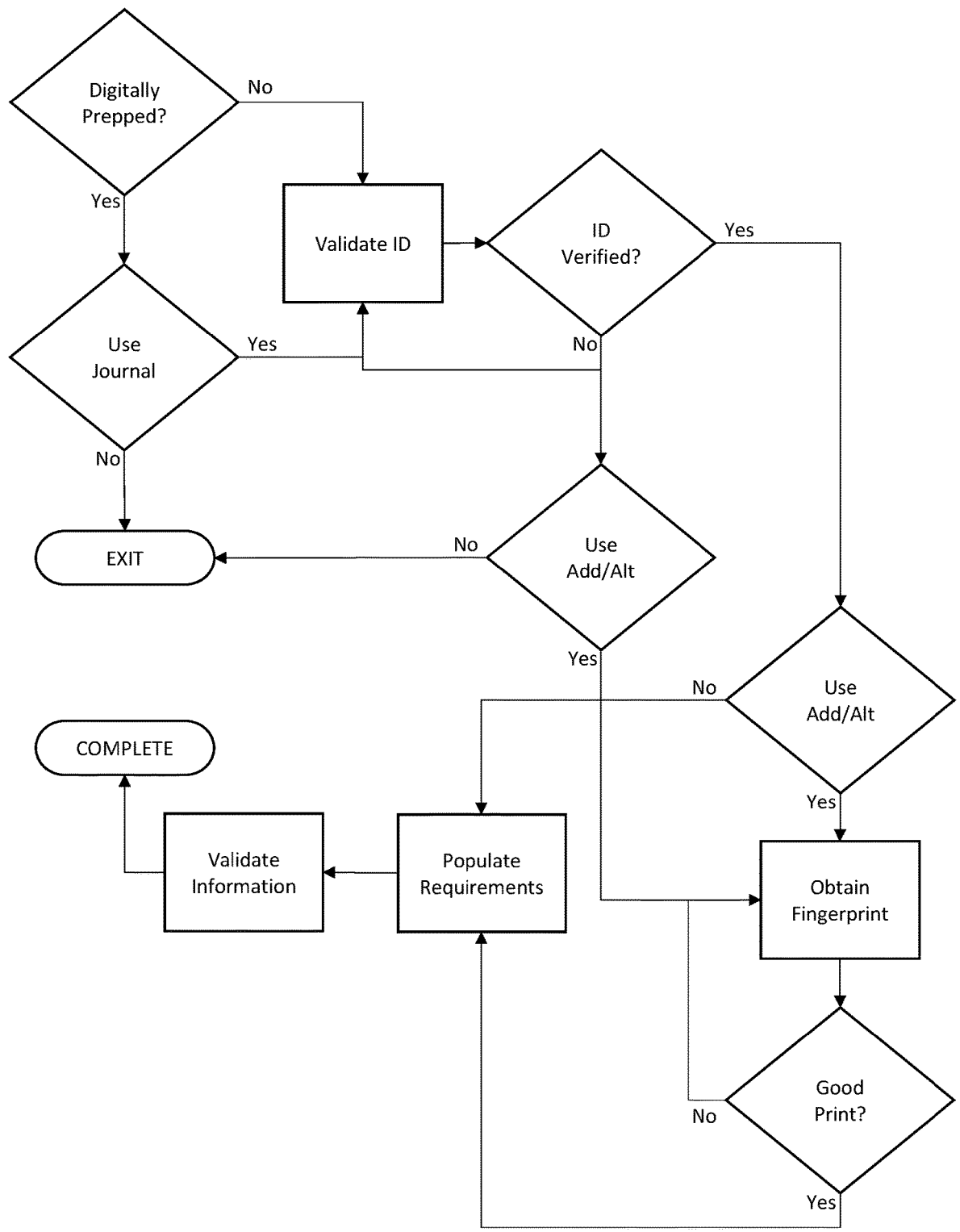
FIG. 9 is a flow chart showing another one of many embodiments of a method for journaling the notarization of a document execution according to the disclosure.
Figure 10:
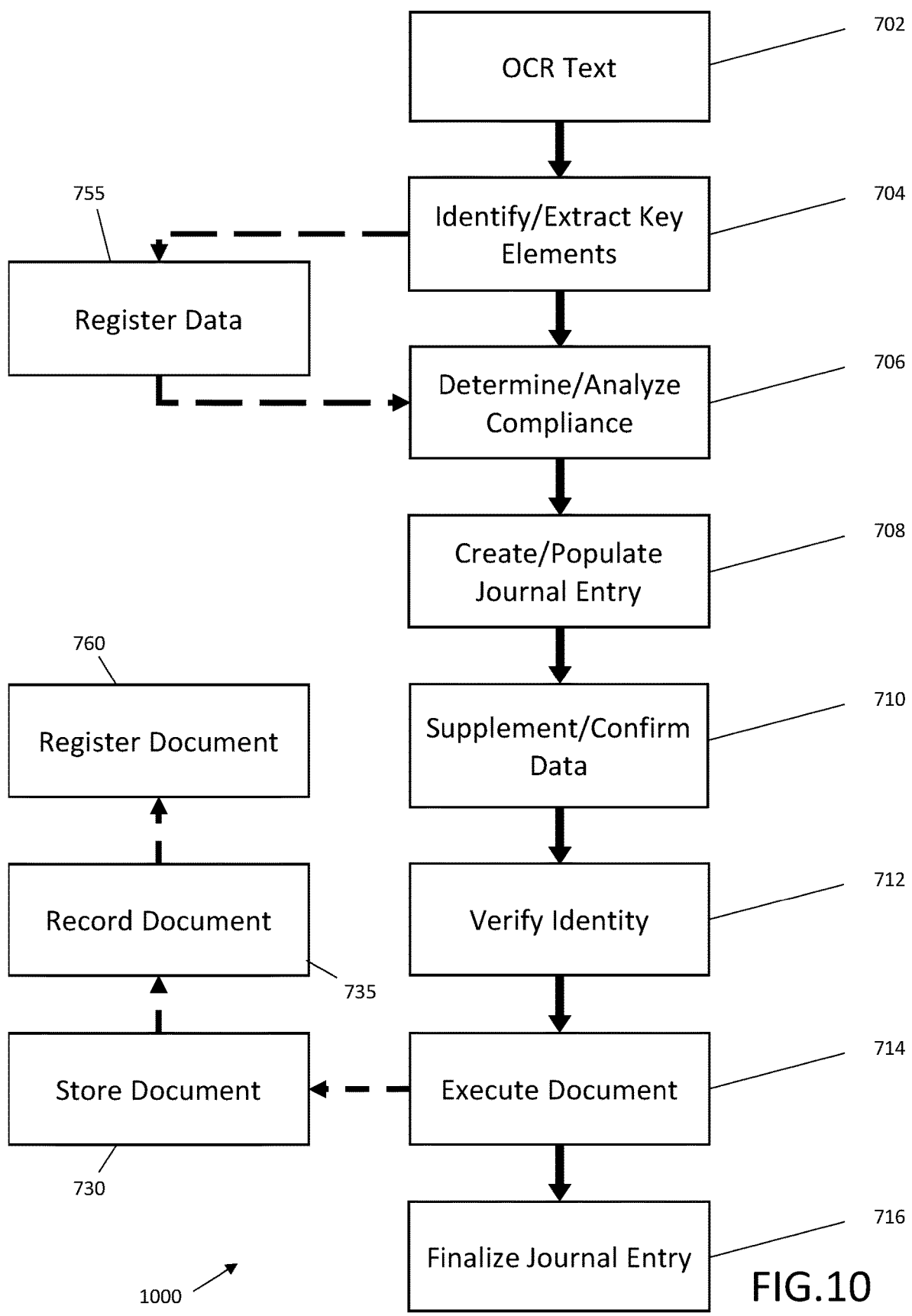
FIG. 10 is a flow chart showing another one of many embodiments of a method for journaling the notarization of a document execution according to the disclosure.
Figure 11:
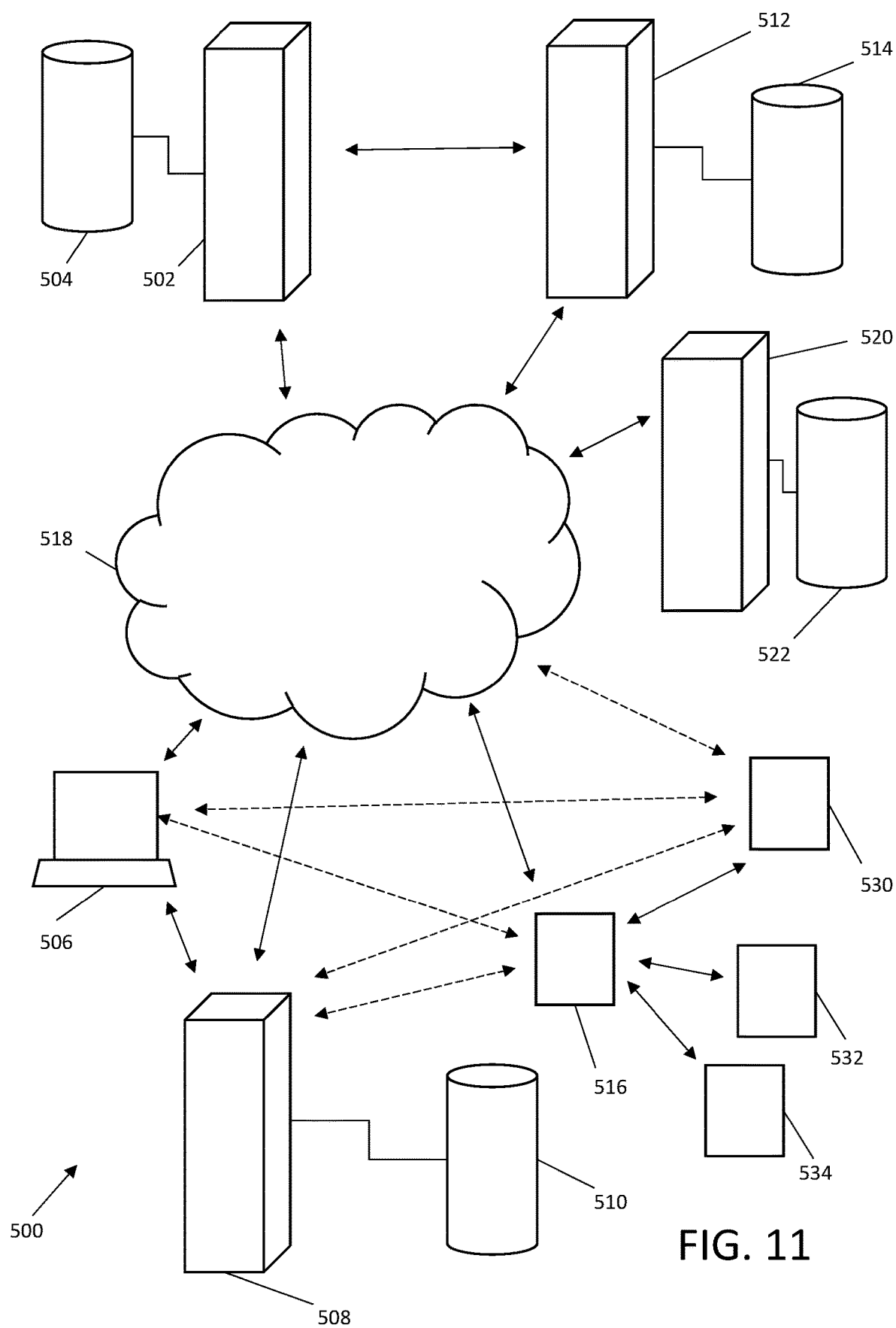
FIG. 11 is a block diagram of one embodiment of a computing environment that can be utilized with the present inventions according to the disclosure.
Figure 12:
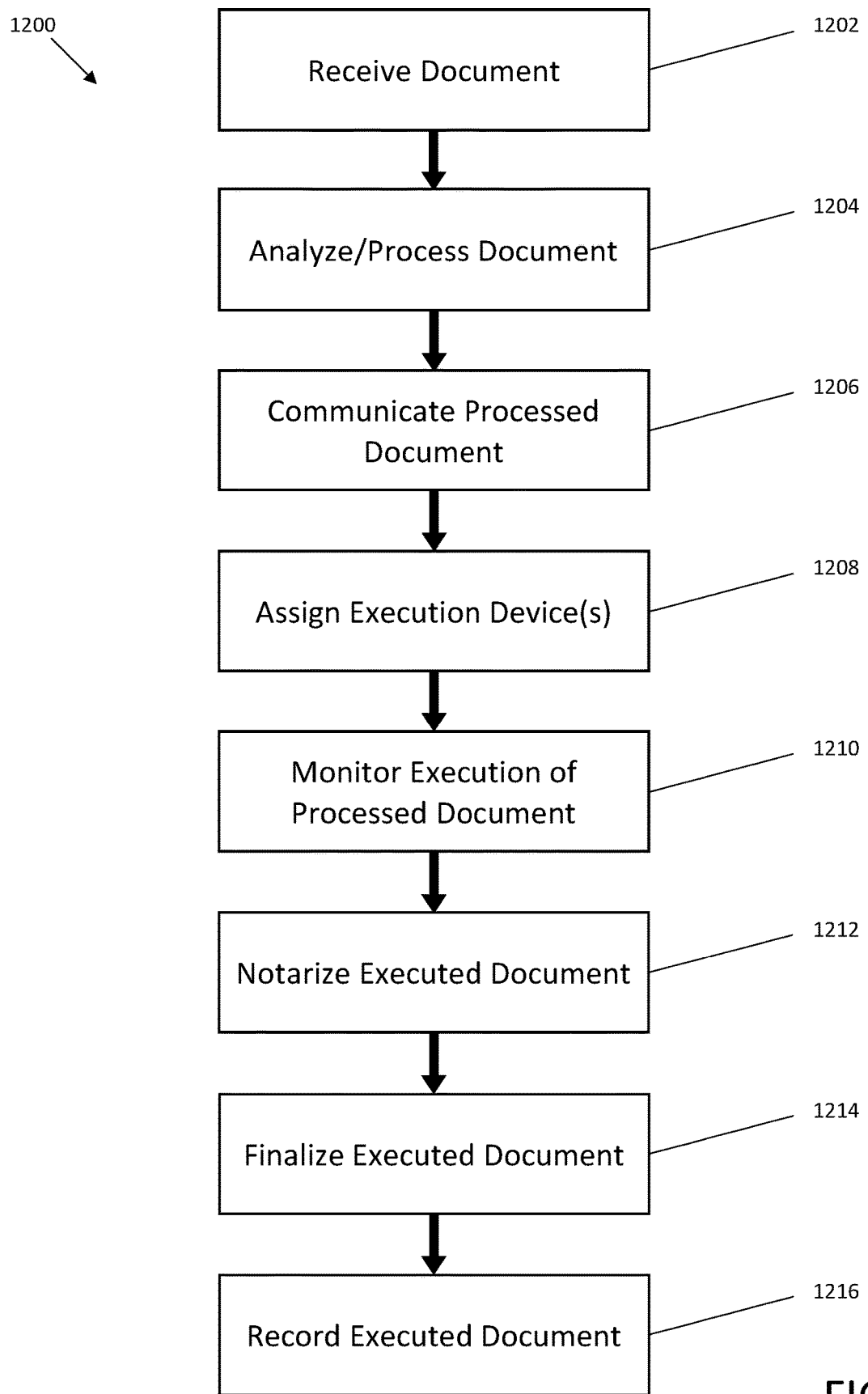
FIG. 12 is a flow chart showing one of many embodiments of a method for managing secure execution of a document according to the disclosure.

FIG. 1 is a flow chart showing one of many embodiments of a document processing method according to the disclosure. FIG. 2 is a flow chart showing one of many embodiments of a portion of a document processing method according to the disclosure. FIG. 3 is a flow chart showing one of many embodiments of another portion of a document processing method according to the disclosure. FIG. 4 is a flow chart showing one of many embodiments of yet another portion of a document processing method according to the disclosure. FIG. 5 is a block diagram of one embodiment of a computing environment that can be utilized with the present inventions according to the disclosure. FIG. 6 is a flow chart showing another one of many embodiments of a document processing method according to the disclosure. FIG. 7 is a flow chart showing another one of many embodiments of a method for journaling the notarization of a document execution according to the disclosure. FIG. 8 is a flow chart showing another one of many embodiments of a method for journaling the notarization of a document execution according to the disclosure. FIG. 9 is a flow chart showing another one of many embodiments of a method for journaling the notarization of a document execution according to the disclosure. FIG. 10 is a flow chart showing another one of many embodiments of a method for journaling the notarization of a document execution according to the disclosure. FIG. 11 is a block diagram of one embodiment of a computing environment that can be utilized with the present inventions according to the disclosure. FIG. 12 is a flow chart showing one of many embodiments of a method for managing secure execution of a document according to the disclosure. FIGS. 1-12 are described in conjunction with one another.

An overview of one implementation of an embodiment of the present inventions is shown in FIG. 1. A process 100 of one embodiment can begin when the systems of the present inventions receive a document and/or information about a document, as shown in step 102. The document and/or information about the document can be received from an outside agent, such as a loan originating agent or a closing agent. The document can be a single page document, a multi-page document, multiple documents, or any combination thereof. For example, in one embodiment of the present invention, the document can be a mortgage/closing package, including loan documents and a deed. In at least one embodiment of the present invention, the document can be some other legal document to be executed, notarized, recorded, or any combination thereof.

In at least one embodiment, as shown in step 104, the systems of the present inventions can perform some analyzation of the document(s). In at least one embodiment, as shown in step 106, or possibly concurrently with the analyzation of step 104, the systems of the present inventions can process the document(s). This analysis and processing are further detailed below.

In at least one embodiment, as shown in step 108, the document(s) is/are reviewed and revised as necessary. This review and be any combination of automated, where the systems of the present inventions can run through a review process, manually reviewed in-house, and/or manually reviewed by the "agent" or some other external entity.

In at least one embodiment, as shown in step 110, the document can be saved. For example, the systems of the present inventions can save the document(s) internally, externally, such as in a third-party system (like a closing agent), or any combination thereof. In at least one embodiment, the document(s) can be sent to some other system for further processing or action.

In at least one embodiment, the document(s) can also be assigned to specific internal or outside "agents", as shown in step 112. In at least one embodiment, the document(s) can also be executed, as shown in step 114. In at least one embodiment, as shown in step 116, the document(s) can also be recorded. Any combination of assignment, execution, and recordation of the processed document can be handled internally or externally to the systems of the present invention.

In at least one embodiment, execution of the processed document can be handled by a document execution system, or sub-system, such as that disclosed in U.S. Pat. No. 10,713,714. Such a document execution system, or sub-system, can function independently of the system of the present invention, can function in concert with of the system of the present invention, can function as part of the system of the present invention, or any combination thereof.

In at least one embodiment, the system of the present invention can export the document to a third party to perform an optical character recognition (OCR), and then import the results of the OCR process from the third party, such as in a JavaScript Object Notation (JSON) format. In at least one embodiment, the system of the present invention itself can perform the OCR, analysis, and other processing, as described herein, and export the processed document, OCR results, JSON data, and/or other metadata, to a third party to handle execution of the processed document. For example, JSON metadata can be imported/exported via an application programming interface (API) to an execution system, or sub-system, that present the results of the coordinates and key elements overlayed on the document during execution using a tablet or other touchscreen computing system.

In at least one embodiment, the execution process can be controlled by the execution system, or sub-system, such that forward progress in the processed document is limited by ensuring that the signatory has signed, dated, selected, and/or initialed each element in the document, before being allowed to complete the process. In at least one embodiment, the execution process can be controlled by ensuring that the signatory has signed, dated, selected, and/or initialed each element on a page, before being allowed to progress to the next page. In at least one embodiment, the execution process can be controlled by ensuring that the signatory has signed, dated, selected, and/or initialed each element in a section of the document, before being allowed to progress to the next section. In at least one embodiment, the execution process can be controlled by ensuring that the signatory has signed, dated, selected, and/or initialed each element in a document, before being allowed to progress to the next document.

One implementation of the analysis 200 that can be performed by an embodiment of the present inventions is shown in FIG. 2. In at least one embodiment, the system of the present invention can identify a purpose of the document(s), as shown in step 202. In at least one embodiment, identifying a purpose of the document can be done by looking for keywords in the document itself, and thus can involve some OCR. In at least one embodiment, identifying a purpose of the document can be done by the uploading agent checking a box, providing information about the document, or providing some other indication of the document's purpose.

In at least one embodiment, the system of the present invention can identify the entities involved or otherwise associated with the document, as shown in step 204. In at least one embodiment, where the document(s) are directed to a typical mortgage transaction, the entities involved or otherwise associated with the document can include buyers, sellers, one or more lenders, real estate agents, closing agents, title agents, one or more recording offices, one or more notaries (possibly including one or more mobile or remote notary) or any combination thereof. Where the document(s) are directed to another type of transaction, the entities involved or otherwise associated with the document can include entities more appropriate for the type of transaction involved. In at least one embodiment, identifying the entities involved or otherwise associated with the document can be done by looking for keywords in the document itself, and thus can involve some OCR. In at least one embodiment, identifying the entities involved or otherwise associated with the document can be done by the uploading agent checking a box, providing information about the document, or providing some other indication of the entities involved.

In at least one embodiment, the system of the present invention can retrieve, or otherwise receive, any requirements of any entities involved or otherwise associated with the document, as shown in step 206. For example, each bank, agent, recording office, governmental agency, etc. might have different requirements, such as required forms, etc.

In at least one embodiment, the system of the present invention can compare the received documents against the requirements, as shown in step 208. In at least one embodiment, the system of the present invention can check that all the needed forms there, that there are proper margins for recording stamps, the lender's information is accurate, the recording office is accurate given the address of the subject property, etc.

As part of this comparison, in conjunction with this comparison, or independently of this comparison, any errors can be identified and corrected, as shown in steps 210 and 212. This identification and/or correction of errors can be performed together, in conjunction, concurrently, iteratively, separately, or any combination thereof. This identification and/or correction of errors can be done through any combination of automatically or manually. For example, in at least one embodiment, where a form is missing, it can be added. In at least one embodiment, where an address does not match the requirements, or otherwise appears wrong, such as not conforming to the PO database or uses an old address for a lender, etc., the system of the present invention can suggest a correction, allowing a user to decide which to use. Such error identification and/or correction can be based on metadata associated with the document, initial analysis of the document, a template identified as being relevant to the document, information stored in any of the data repositories 504, 510, 514, or any combination thereof.

In at least one embodiment, the analysis 200 can include capturing information from a title (or other) agent, when they upload the document. Such captured information can be provided directly by the agent, gleaned from analysis of the document itself, or some combination thereof. This captured information can be used to inform the analysis and/or processing of the document. For example, in the case of a mortgage transaction, this captured information can include or identify one or more of a loan originating system (LOS), a loan identification number or other identifier, an identification of title software, a mortgage identification number (MIN), a document type, a lender name, a lender identification number or other identifier, a title agency name, a title agency identification number or other identifier, a title agent name, a title agent identification number or other identifier, a loan officer name, a loan officer identification number or other identifier, a notary name, a notary identification number or other identifier, a signatory name, a signatory type, a signatory address, a signatory email, a signatory phone number, a signatory identification number, number of signers, state of the signers, loan type (ARM, FHA, VA, USDA, Jumbo, Balloon, Bridge, 10-year, 15-year, 30-year, 40-year, adjustable, fixed, etc. or any combination thereof) or other identifier.

In at least one embodiment, as shown in step 214, the system of the present invention can identify a template based on the captured information, provided directly by the agent, gleaned from analysis of the document itself, or some combination thereof. A template can include information that can aid the system of the present invention in performing the analysis and/or processing of the document. For example, a template can include an identification of where specific data and/or data fields are located within the document and/or metadata of the document.

One implementation of the processing 300 that can be performed by an embodiment of the present inventions is shown in FIG. 3. In at least one embodiment, the processing 300 can include performance of an OCR process, as shown in step 302. This OCR process can be in addition to any OCR performed in the analysis 200, or be one and the same. In at least one embodiment, the system of the present invention can identify elements within the document, as shown in step 304. For example, the system of the present invention can identify elements such as blank spaces or portions for Signatures, Initials, Selections, Date Signed, Long Date, Free Form, other data fields, or any combination thereof.

In at least one embodiment, as shown in steps 306, 308, 310, the system of the present invention can identify coordinates of text, blank spaces, and checkboxes (or other selection elements). For example, such elements may be identified by analyzing each page for lines, squares, rectangles, circles, ovals, symbols, other geometric shapes, or any combination thereof. In at least one embodiment, for each potential element, a confidence score is generated based on a template and/or a set of rules that can either increase or decrease the probability that the element is a field that needs to be filled out by the user, or signatory.

In at least one embodiment, for selection elements such as check boxes, their size and/or position can be compared to the size and/or position of surrounding text, as well as the size and/or position of other potential selection elements on the page to determine if it is an actual selection element or some other artifact that should be ignored. In at least one embodiment, for selection elements such as check boxes, their size and/or position can be compared to a template.

In at least one embodiment, for a table and/or a grid type structure on the page, a hierarchy can be created of table cells to determine which parts of the page and/or form relate to each other. In at least one embodiment, a table and/or a grid type structure on the page can be compared to a template. In at least one embodiment, for line elements, their length and/or position can be compared to the position of surrounding text to determine if that potential element is a blank line, or just underlined text, which should be ignored. In at least one embodiment, the length and/or position of line elements can be compared to a template.

In at least one embodiment, signature elements can be identified by line or rectangle elements with surrounding text, such as a person's name or title, and/or another identifier, such as the words "signature" or "sign here", that indicates a signature element. Similarly, initials elements can be identified by line or rectangle elements with surrounding text or another identifier, such as the words "initials" or "initial here", that indicates a initials element. Date elements, such as a signature date, a long date, or an effective date, can be identified by line or rectangle elements with surrounding text or another identifier, such as the word "Date", that indicates a date element. In at least one embodiment, free form elements can be identified by line or rectangle elements without surrounding text that indicates another type of element.

In at least one embodiment, selection elements can be identified by two or more aligned and duplicate squares, rectangles, circles, ovals, symbols, or other geometric shapes. In at least one embodiment, selection elements can be identified by two or more aligned squares, rectangles, circles, ovals, symbols, other geometric shapes, or combinations thereof. In at least one embodiment, selection elements can be identified by two or more vertically aligned squares, rectangles, circles, ovals, symbols, other geometric shapes, or combinations thereof.

In at least one embodiment, the system of the present invention can apply a machine learning engine to the processing 300 of the document(s). For example, the system of the present invention can receive or otherwise retrieve inputs from multiple document analysis sources and analyze which one or combination of them would be the best to apply to a given document. In at least one embodiment, these document analysis sources can include Amazon Web Services (AWS), Microsoft Azure, Open CV, another document analysis source, or any combination thereof.

In at least one embodiment, the system of the present invention can apply a machine learning engine to the processing 300 based on a template and/or other information provided with each document. This machine learning engine will allow the analysis 200 and/or the processing 300 to improve iteratively at recognizing the best input to use or how to combine various aspects of multiple inputs into one to create the best analysis 200 and/or processing 300 (or portion thereof such as the OCR process) to apply to a given document. For example, in at least one embodiment, the system of the present invention can not only take in an ever-increasing number of inputs into the learning engine, but it can also decide based on inputs like the lender, number of signers, types of documents etc. which input or custom combination of them will best be applied to the document. In at least one embodiment, the system of the present invention can allow a user to override any such automated process and decide to use a specific input, such as if the selected input is more relevant for the given situation.

In at least one embodiment, as shown in step 312, the system of the present invention can create one or more data layer(s). In at least one embodiment, each page can have one data layer that receives all inputs. For example, this can be done free-form, such that this one layer can receive all additional typing or handwriting. In at least one embodiment, this one layer can be completely free of limitations, such that it can receive typing or handwriting anywhere on the page.

In at least one embodiment, each page can have discrete boxes, each of which can receive typing or handwriting therein. For example, handwriting, or portions thereof, outside of a box, can be ignored or not recognized. In at least one embodiment, the system of the present invention can recognize someone trying to sign in a signature box and allow that signature to spill out of the box. In at least one embodiment, the system of the present invention can recognize someone trying to sign in a signature box and automatically resize the signature (locking the aspect ratio, for instance) to fit completely in the box.

In at least one embodiment, the system of the present invention can include a first layer for each page having discrete boxes, each of which can receive typing. In at least one embodiment, the system of the present invention can include a second layer to receive handwriting. The second layer can attempt to confine signatures to discrete boxes, resize signatures as discussed above, can be completely free-form, letting the user write anything anywhere, or any combination thereof.

In at least one embodiment, the system of the present invention can include a layer for each page having discrete boxes, each of which can receive typing, and additional layers for each signature/initial to receive handwriting. For example, the system of the present invention can have an initials layer on each page, allowing a user to initial anywhere, and a signature layer for each page (or signature pages), allowing a user to sign anywhere. In at least one embodiment, the initials and/or signature can be left where it occurred, relative to the page, or be moved (and/or resized) to fit the appropriate box or blank.

In at least one embodiment, the system of the present invention can include a separate "layer" for every box or blank. For example, each box or blank can be selected, either in turn sequentially, manually, according to some step in the overall process, or some combination thereof. Each "layer", for each box, can cover the entire page and/or accept typing and/or handwriting anywhere on the page, which can then be left as is where is, or relocated and/or resized to fit in the appropriate box.

In at least one embodiment, the system of the present invention can replace a handwritten input with a typed version thereof, by recognizing content of such handwritten input. In at least one embodiment, the system of the present invention can replace a handwritten address or date, for example, with a typed version thereof.

In at least one embodiment, the system of the present invention can handle, or process, input received for each box or blank independently, such that any box or blank is processed independently of any other box or blank. In at least one embodiment, the system of the present invention can handle, or process, input received for each box or blank depending on how input received for another box or blank is received or processed.

In at least one embodiment, the system of the present invention can utilize multiple layers, such as HTML5 canvases. In at least one embodiment, there can be a first layer that includes the original document itself. In at least one embodiment, there can be a second layer that includes the OCR results, which may be visibly or invisibly overlain on the first layer. In at least one embodiment, there can be a third layer that includes the elements identified above, which may be visibly or invisibly overlain on the first layer and/or second. In at least one embodiment, there can be a fourth layer that includes user inputs, such as handwritten signatures, initials, dates, selections, or any combination thereof. Any these layers can be further split into additional layers, depending on the needs of a specific implementation of the present inventions. In at least one embodiment, select ones of these layers can be combined.

In at least one embodiment, the system of the present invention can compare the processed document with one or more templates. Any of these templates can be updated based on the processed document, or created therefrom, as shown in step 314. For example, the system of the present invention can create a new template based on the processed document. In at least one embodiment, the system of the present invention can display differences in the processed document and a template, letting a user decide which changes in the processed document should be incorporated into the template. In at least one embodiment, the system of the present invention can allow a user to manually change or create template independently of the processed document.

One implementation of a review 400 that can be performed by an embodiment of the present inventions is shown in FIG. 4. For example, in at least one embodiment, the system of the present invention can provide a review 400 of the template(s) and/or the processed document. In at least one embodiment, the system of the present invention can compare the processed document to a template, as shown in step 402. In at least one embodiment, the system of the present invention can receive corrections, as shown in step 404. Receiving corrections can include receiving such corrections automatically (such as by comparison with a template), manually (such as an agent or other user changing the suggested configuration of one or more data fields/boxes/blanks), or any combination thereof. Those corrections can be implemented as they are received or collectively, as shown on step 406. Then, in at least one embodiment, the system of the present invention can update any templates as appropriate, as shown in step 408. For example, a template can be updated based on a user's modification of a document. In at least one embodiment, a template can be updated based on a user's modification of the template directly.

In at least one embodiment, templates can be saved and secured using a secure hash algorithm (SHA). In at least one embodiment, each page of a template can be saved and separately encoded as a unique SHA hash based on the text, character spacing, blocks of text within the document, or any combination thereof. When a new document, or page thereof, is uploaded to the system of the present invention, the analysis 200 and/or processing 300 performed by the system can include comparing the document or page against existing saved template hashes. In at least one embodiment, where a document or page is found to be less than 50% similar to an existing saved template, then the system can proceed with the analysis of the document or page. In at least one embodiment, where a document or page is found to be 50% or less similar to an existing saved template, then the system can proceed with the analysis of the document or page. In at least one embodiment, where a document or page is found to be 50% or more similar, or some other threshold, to an existing saved template, then the system can apply the template to the document or page. For example, the system of the present invention can apply where key elements are located on a page based on an existing template. A user can then remove, add, move, or otherwise adjust each key element, as desired. In at least one embodiment, the user can update the template as they are adjusting a specific document or when they are done adjusting the document. In at least one embodiment, the user can create a new template based upon adjustments to specific document or other template.

In at least one embodiment, the system of the present invention can remove one or more variables, such as addresses, names, etc. from a processed document, when creating a template therefrom so that only the functional components are incorporated into the hash. For example, in at least one embodiment, the system of the present invention can remove personally identifiable information, so that saved templates do not incorporate that information and/or are not restricted by documents with such information. In at least one embodiment, the system of the present invention can apply templates to other documents across a wide range of clients without sharing identifiable information, which can improve the quality of templates for all users of the system currently and/or in the future. In at least one embodiment, the system of the present invention can create a hash for the entire document, a hash for the entire page, a hash for each line within the page, or any combination thereof. In at least one embodiment, the system of the present invention can compare a new document, once it is uploaded, against the hash for the entire document, each page, each line, or any combination thereof. This process can be performed iteratively, with or without drilling down. For example, in at least one embodiment, the system of the present invention can compare a new document against the hash for the entire document, and if it is 50% or more similar, the system of the present invention can compare each page of a document against the hash for each page to inform the placement of the elements. In at least one embodiment, the system of the present invention can compare each page of a document against the hash for each page, and if it is 50% or more similar, the system of the present invention can compare each line against the hash for each line to determine the similarities or differences to inform the placement of the elements. In at least one embodiment, the system of the present invention can compare a new document against the hash for the entire document, and if it is 50% or more similar, the system of the present invention can compare each page of a document against the hash for each page, and if it is 50% or more similar, the system of the present invention can compare each line against the hash for each line to determine the similarities or differences to inform the placement of the elements.

In at least one embodiment, the system of the present invention can compare a new document against the hash for the entire document, and if it is above 50% similar, the system of the present invention can compare each page of a document against the hash for each page to inform the placement of the elements. In at least one embodiment, the system of the present invention can compare each page of a document against the hash for each page, and if it is above 50% similar, the system of the present invention can compare each line against the hash for each line to determine the similarities or differences to inform the placement of the elements. In at least one embodiment, the system of the present invention can compare a new document against the hash for the entire document, and if it is above 50% similar, the system of the present invention can compare each page of a document against the hash for each page, and if it is above 50% similar, the system of the present invention can compare each line against the hash for each line to determine the similarities or differences to inform the placement of the elements.

One implementation of a computing environment 500 that can be utilized by an embodiment of the present inventions is shown in FIG. 5. In at least one embodiment, the system of the present invention can include a server 502 with a database, or other data repository, 504. In at least one embodiment, the server 502 can be a stand-alone server or server farm, or be implemented in a cloud computing system.

In at least one embodiment, the server 502 can receive the document, such as through FTP or some other upload, from an external computer 506, such as a closing agent's office computer, which may be on communication with their back-office system 508 and/or data repository 510, from the agent's system 508, from a LOS, or other lender system, 512, or any combination thereof. For example, some pages of a document (or documents of a set of documents) may be collected from different entities.

In at least one embodiment, the server 502 can perform one or more of the processes described herein on the document, possibly with reference to outside systems and/or data sources, such as the US Post Office, or other governmental or private entities, such as a county recorder's office 520 or a lender or LOS 512 and/or their databases 522, 514, respectively. In at least one embodiment, the server 502 can make the processed document available to a computing device 516, such as a tablet at the closing agent's office a mobile notary in the field, or some combination thereof, such as for execution. The system of the present invention can communicate fully executed documents to the local counties or other entities 520 to register the documents into online databases 522 where applicable, or connect with a 3rd party service for recordation. All or any of this communication can be done directly or through a network 518, such as the Internet or some other network and may use virtual private networks.

In at least one embodiment, the tablet 516 that is used for execution communicates directly with the server 502 of the present invention, which processes the document as discussed herein, and therefore does not communicate directly with the closing agent's office computer 506, the closing agent's system 508, or the lender's system (or LOS) 512. In at least one embodiment, however the tablet 516 that is used for execution is capable of communicating with the server 502 of the present invention, the closing agent's office computer 506, the closing agent's system 508, the lender's system (or LOS) 512, or any combination thereof.

In at least one embodiment, the server 502 of the present invention can receive the document, or set of documents, from the closing agent's office computer 506 and/or the closing agent's system 508. In at least one embodiment, the server 502 of the present invention can receive some portion of the document, or set of documents, from the closing agent's office computer 506 and/or the closing agent's system 508, and another portion from the lender's system (or LOS) 512. In at least one embodiment, the server 502 of the present invention can receive loan, lending, and/or documentation requirements from the lender's system (or LOS) 512. In at least one embodiment, the server 502 of the present invention can receive filing requirements from the county recorder's office 520. In at least one embodiment, the server 502 of the present invention can compare deed information received from the closing agent's office computer 506 and/or the closing agent's system 508 with ownership information received from the county recorder's office 520.

In at least one embodiment, the server 502 of the present invention can communicate with the county recorder's office 520 to determine the capability of the county recorder's office 520 to electronically record or register the document. In at least one embodiment, the server 502 of the present invention can communicate with a third-party system to accomplish recordation or registration of the document, such as where the county recorder's office 520 lacks the capability to electronically record or register the document. In at least one embodiment, the server 502 of the present invention can communicate with Mortgage Electronic Registration System (MERS) to record or register the document.

In at least one embodiment, a method 100 of preparing a document for execution can include receiving, a document from a computer system 506, 508 of an agent. In at least one embodiment, the document can be received at a processing location 502, 504 and/or from an agent location. In at least one embodiment, the document can be received in a PDF format and/or comprise one or more pages.

In at least one embodiment, the method can include receiving information about the document from the agent. In at least one embodiment, the information about the document can be received at the processing location 502, 504 and/or from the agent location 506, 508.

In at least one embodiment, the method can include identifying a template. In at least one embodiment, the template can be identified and/or saved at the processing location 502, 504. In at least one embodiment, the template can be identified by analysis of the information and/or the document.

In at least one embodiment, the method can include performing an optical character recognition (OCR) the document. In at least one embodiment, the OCR can be performed on each page of the document. In at least one embodiment, the OCR can recognize text and non-text characters or elements. In at least one embodiment, the OCR can recognize the coordinates of text and non-text characters or elements. In at least one embodiment, the OCR can be performed at the processing location 502, 504.

In at least one embodiment, the method can include identifying at least one signature element in the document. In at least one embodiment, identifying the signature element can include identifying a signature coordinate of the signature element. In at least one embodiment, the signature element can be identified at the processing location 502, 504 and/or with reference to the template.

In at least one embodiment, the method can include identifying at least one initial element in the document. In at least one embodiment, identifying the initial element can include identifying an initial coordinate of the initial element. In at least one embodiment, the initial element can be identified at the processing location 502, 504 and/or with reference to the template.

In at least one embodiment, the method can include identifying at least one date element in the document. In at least one embodiment, identifying the date element can include identifying a date coordinate of the date element. In at least one embodiment, the date element can be identified at the processing location 502, 504 and/or with reference to the template.

In at least one embodiment, the method can include identifying at least one selection element in the document. In at least one embodiment, identifying the selection element can include identifying a selection coordinate of the selection element. In at least one embodiment, the selection element can be identified at the processing location 502, 504 and/or with reference to the template.

In at least one embodiment, the method can include identifying at least one freeform element in the document. In at least one embodiment, identifying the freeform element can include identifying a freeform coordinate of the freeform element. In at least one embodiment, the freeform element can be identified at the processing location 502, 504 and/or with reference to the template.

In at least one embodiment, the method can include creating a base layer for the document. In at least one embodiment, creating the base layer can include creating a base layer for each page of the document. In at least one embodiment, the base layer can include each page of the document as received, such as from the agent. In at least one embodiment, the base layer can be created at the processing location 502, 504.

In at least one embodiment, the method can include creating a text layer for the document. In at least one embodiment, creating the text layer can include creating a text layer for each page of the document. In at least one embodiment, the text layer can be separate from the base layer and/or include text recognized from each page of the document. In at least one embodiment, the text layer can be created at the processing location 502, 504.

In at least one embodiment, the method can include creating an elements layer for the document. In at least one embodiment, creating the elements layer can include creating an elements layer for each page of the document. In at least one embodiment, the elements layer can be separate from the base layer and/or the text layer. In at least one embodiment, the elements layer can include the signature element at the signature coordinate. In at least one embodiment, the elements layer can include the initial element at the initial coordinate. In at least one embodiment, the elements layer can include the date element at the date coordinate. In at least one embodiment, the elements layer can include the selection element at the selection coordinate. In at least one embodiment, the elements layer can include the freeform element at the freeform coordinate. In at least one embodiment, the elements layer can be created at the processing location 502, 504.

In at least one embodiment, the method can include creating an interaction layer for the document. In at least one embodiment, creating the interaction layer can include creating an interaction layer for each page of the document. In at least one embodiment, the interaction layer can be separate from the base layer, the text layer, the elements layer, or any combination thereof. In at least one embodiment, the interaction layer can include a signature input field for the signature element at the signature coordinate. In at least one embodiment, the interaction layer can include an initial input field for the initial element at the initial coordinate. In at least one embodiment, the interaction layer can include a date input field for the date element at the date coordinate.

In at least one embodiment, the interaction layer can include a selection input field for the selection element at the selection coordinate. In at least one embodiment, the interaction layer can include a freeform input field for the freeform element at the freeform coordinate. In at least one embodiment, the interaction layer can be created at the processing location 502, 504.

In at least one embodiment, the method can include assembling a processed document. In at least one embodiment, assembling the processed document can include overlaying the text layer over the base layer. In at least one embodiment, assembling the processed document can include overlaying the elements layer over the text layer. In at least one embodiment, assembling the processed document can include overlaying the interaction layer over the elements layer. In at least one embodiment, assembling the processed document can be performed at the processing location 502, 504.

In at least one embodiment, the method can include communicating the processed document to a touchscreen computing device 516. In at least one embodiment, the touchscreen computing device 516 can be isolated from the computer system 506, 508 at the agent's location. In at least one embodiment, the processed document can be communicated from the processing location 502, 504 and/or to the agent's location.

In at least one embodiment, the method can include receiving an executed document from the touchscreen computing device 516. In at least one embodiment, the executed document can comprise the processed document with input received in the signature input field. In at least one embodiment, the executed document can comprise the processed document with input received in the initial input field. In at least one embodiment, the executed document can comprise the processed document with input received in the date input field. In at least one embodiment, the executed document can comprise the processed document with input received in the selection input field. In at least one embodiment, the executed document can comprise the processed document with input received in the freeform input field. In at least one embodiment, the executed document can be received at the processing location 502, 504 and/or from the agent's location 506, 508.

In at least one embodiment, the method can include creating a finalized document. In at least one embodiment, the method can include creating a finalized document by preventing further modification of the base layer. In at least one embodiment, the method can include creating a finalized document by preventing further modification of the text layer. In at least one embodiment, the method can include creating a finalized document by preventing further modification of the elements layer. In at least one embodiment, the method can include creating a finalized document by preventing further modification of the interaction layer. In at least one embodiment, the finalized document can be created at the processing location 502, 504.

In at least one embodiment, the method can include communicating the finalized document to a recordation facility 520, 522 for formal recordation of the finalized document. In at least one embodiment, the method can include communicating the finalized document to third party for formal recordation of the finalized document. In at least one embodiment, the finalized document can be communicated from the processing location 502, 504.

In at least one embodiment, identifying the signature element can comprise identifying a geometric element and/or identifying adjacent text that indicates the geometric element is associated with a signature entry. In at least one embodiment, identifying the initial element comprises identifying a geometric element and/or identifying adjacent text that indicates the geometric element is associated with an initial entry. In at least one embodiment, identifying the date element comprises identifying a geometric element and/or identifying adjacent text that indicates the geometric element is associated with a date entry. In at least one embodiment, identifying the selection element comprises identifying two or more vertically-aligned identical geometric elements.

In at least one embodiment, a method of preparing a document for execution can include receiving, at a processing location 502, 504, a document from a computer system of an agent 506, 508. In at least one embodiment, the document can comprise one or more pages. In at least one embodiment, the method can include receiving, at the processing location 502, 504, information about the document from the agent. In at least one embodiment, the method can include performing, at the processing location 502, 504, an optical character recognition of each page of the document to recognize text and non-text characters and their coordinates on each page of the document. In at least one embodiment, the method can include identifying, at the processing location 502, 504, at least one signature element in the document including a signature coordinate of the signature element. In at least one embodiment, the method can include creating, at the processing location 502, 504, a base layer for each page of the document, the base layer including each page of the document as received from the agent.

In at least one embodiment, the method can include creating, at the processing location 502, 504, an elements layer for each page of the document. In at least one embodiment, the elements layer can be separate from the base layer. In at least one embodiment, the elements layer can include the signature element at the signature coordinate.

In at least one embodiment, the method can include creating, at the processing location 502, 504, an interaction layer for each page of the document. In at least one embodiment, the interaction layer can be separate from the elements layer and/or the base layer. In at least one embodiment, the interaction layer can be transparent. In at least one embodiment, the interaction layer can include a signature input field at the signature coordinate.

In at least one embodiment, the method can include assembling, at the processing location 502, 504, a processed document by overlaying the elements layer over the base layer. In at least one embodiment, the method can include assembling, at the processing location 502, 504, a processed document by overlaying the interaction layer over the elements layer. In at least one embodiment, the method can include communicating the processed document from the processing location 502, 504 to a touchscreen computing device 516 at the agent's location. In at least one embodiment, the touchscreen computing device 516 can be in communication with, or isolated from, the computer system 506, 508 at the agent's location.

In at least one embodiment, a method of preparing a document for execution can include receiving a document. In at least one embodiment, the method can include performing an optical character recognition of the document to recognize text and non-text characters and their coordinates in the document. In at least one embodiment, the method can include identifying at least one signature element in the document including a signature coordinate of the signature element. In at least one embodiment, the method can include creating a base layer of the document. In at least one embodiment, the base layer can include the document as received from the agent. In at least one embodiment, the method can include creating an interaction layer of the document. In at least one embodiment, the interaction layer can be separate from the base layer. In at least one embodiment, the interaction layer can be transparent. In at least one embodiment, the interaction layer can include a signature input field at the signature coordinate. In at least one embodiment, the method can include assembling a processed document by overlaying the interaction layer over the base layer.

An overview of another implementation 600 of an embodiment of the present inventions is shown in FIG. 6. The processes of the present inventions can be performed in multiple phases and/or by multiple systems, subsystems, or entities. In at least one embodiment, the processes of the present inventions can be performed by one system or entity, without the utilization of separate subsystems. In at least one embodiment, select processes of the present inventions can be performed by one system or entity, with other processes being performed by another system, subsystem, or entity.

For example, one system, subsystem, or entity can perform client facing functions, such as the document execution system. Another system, subsystem, or entity can perform document preparation. Another system, subsystem, or entity can perform document processing. Another system, subsystem, or entity, can perform document and/or template storage.

In at least one embodiment, the document can be uploaded, such as by the agent. Alternatively, or additionally, the agent can assemble, compile and/or arrange lender and/or title documents, with or without using systems of the resent invention. The agent or the system can check and/or confirm that all closing documents are included. The agent or the system can then upload, or otherwise send, the complete and final package.

Another system, subsystem, or entity can then copy or store the document. Another system, subsystem, or entity can then perform an OCR or other scan, extracting text and XY coordinates of the text. Then, the system can analyze the text to detect an involved entity. Key text elements can then be identified. Another system, subsystem, or entity can then initiate a line detection function. Another system, subsystem, or entity can then receive document data of key text elements including what a text box, line, or circle looks like. Then, the system can extract the text box, lines, and circles from the document.

Another system, subsystem, or entity can then analyze the document and/or document information, in an attempt to identify if a template exists. If a template is found, it is applied to identify matching key elements on the page(s). If a template is not found, the system run through a markup process. Another system, subsystem, or entity can then receive the document data and show a user an automated markup and/or allow the user to perform a manual markup.

In at least one embodiment, the system of the present invention can take in a document for use in a loan closing process and deliver it to an OCR service. In at least one embodiment, the system of the present invention can receive an OCR data feed from the OCR service. In at least one embodiment, the system of the present invention can apply a saved template and/or use machine learning methods to apply OCR to specific areas of a document for user confirmation or edits, that can then be exported for a digital signing.

In at least one embodiment, the system of the present invention can view an OCR data analysis feed on an uploaded document as interchangeable. In at least one embodiment, the system of the present invention can be adaptable to where the data feed comes from (i.e. AWS, Azure, or an internal service). In at least one embodiment, the OCR data source can be swapped out for any number of different sources to enable a constant flow of OCR data about the document without any downtime.

In at least one embodiment, the system of the present invention can be primed with a series of documents and templates from one or more mortgage lending client(s). In at least one embodiment, in the absence of templates, or any applicable templates, the system of the present invention can take a "best guess" as to where the lines, initials, boxes, and/or other elements are using the methods described herein. In at least one embodiment, the system of the present invention can incorporate human interaction to confirm the quality of the "best guess" and/or to create a saved template that can be used in the future to quickly apply fields and/or elements to new documents.

In at least one embodiment, templates can be saved as a hash for the entire page and hashes for each individual line item as explained herein. If the hash for the full uploaded page is 50% similar it continues to analyze line by line to deploy the template that closest fits the document in different sections and make informed, learned guesses about areas that do not match the lines' hash. If it is not 50% similar it continues to run through the list of templates until it runs out and will then apply an informed guess based on its level of training at that given moment.

Over time the system can learn and apply knowledge from existing templates to future iterations to improve these guesses and/or templates. In at least one embodiment, whenever a template is saved, the identifiable information, addresses, names etc. can be removed leaving a basic document that can be used to inform future incoming documents. In at least one embodiment, when a new document is uploaded the system can be able to not only compare against a range of templates but also have baseline knowledge of the likelihood of a certain section of the page being a line, initial, etc. and/or other elements to apply to the document if it has to apply OCR without a matching template. In this manner, the system of the present invention can leverage an ever-growing list of existing templates and/or be trained on prior documents to select OCR key elements.

An overview of one implementation of an embodiment of the present inventions is shown in FIG. 7. A process 700 of one embodiment can begin when the systems of the present inventions receive a document and/or information about a document. In at least one embodiment, the process 700 can include performance of an OCR process, as shown in step 702. This OCR process can be in addition to any OCR performed in the analysis 200, the OCR process 302, or be one and the same. In at least one embodiment, the system of the present invention can identify and/or extract elements within the document, as shown in step 704. For example, the system of the present invention can identify elements such as names, locations, other data fields, or any combination thereof.

In at least one embodiment, the system of the present invention can analyze or determine the requirements for a notarization journal entry for the document, as shown in step 706. These requirements may vary based on the entities involved, the location the document will be executed, the type of document, the location of an underlying real estate property to which the document relates, or any combination thereof.

In at least one embodiment, the system of the present invention can create the journal entry based on the requirements, as shown in step 708. This, or any other, step can also include populating the journal entry with the information extracted from the document or from other sources. In at least one embodiment, the system of the present invention can prompt the entity, the notary, closing agent, loan officer, another person, or any combination thereof to supply any information that may be missing and/or confirm the information in the journal entry, as shown in step 710. For example, some information, such as a fee charged by the notary, may not be included in the information extracted from the document, but may be required for the journal entry.

In at least one embodiment, the system of the present invention can verify the identity of the entity executing the document, as shown in step 712. In the case of a person, this can include taking that person's picture, a picture of their ID card, their fingerprint, a retinal scan, another biological identifier, or any combination thereof. That person's picture can be compared with the picture on their ID card manually, such as by the notary, or automatically using facial recognition software. Their ID card can be compared with one or more databases of government issued IDs, such as that maintained by Stripe, Inc., to verify that the ID is valid. Their fingerprint can be compared with one or more databases to confirm their identity. In at least one embodiment, the fingerprint is stored for future confirmation. In the case of an incapacitated person or a legal entity, for example, the above verification can be performed with respect to a representative of the entity and/or can include verifying that the representative is authorized to execute the document.

In at least one embodiment, the system of the present invention can facilitate execution of the document, such as discussed at length above, as shown in step 714. In at least one embodiment, the system of the present invention can finalize the journal entry by locking and storing the journal entry in a secure storage device or facility, as shown in step 716. In at least one embodiment, this can be done concurrently, or consecutively, with recordation of the executed document. In at least one embodiment, controlled, or otherwise limited, access to the journal entry, or portions thereof, can be made available to appropriate parties, such as the entities involved, lenders, governmental agencies, etc. For example, in at least one embodiment, loan officers can be provided a link and/or password/pin that allows access to portions of the journal entry for a limited period of time.

In at least one embodiment, the document can be recorded as described in co-pending U.S. patent application Ser. No. 17/666,477 filed Feb. 7, 2022, which has been incorporated herein by specific reference. Several of the disclosed processes, in either disclosure, may be performed together, such as concurrently, simultaneously, consecutively, or any combination thereof. For example, a singe data extraction step can be performed, with different pieces of the extracted data going into different processes. In at least one embodiment, the format for such a data extraction can be uniform and/or can comply with standardized formats, such as the Uniform Electronic Transactions Act. In at least one embodiment, creation of the journal entry can be performed at the same time as creation of a registry entry, a database storage entry for the document, a recordation package (to facilitate recordation of the document), or any combination thereof.

In at least one embodiment, a method of journaling the notarization of a document execution can include receiving a document; extracting text from the document; identifying at least one entity to execute the document; identifying at least one location for the document; determining, from the location, at least one notarization requirement for execution of the document; creating a journal entry for notarization of execution of the document; populating the journal entry with at least a portion of the extracted text; validating information within the journal entry; verifying an identity; facilitating execution of the document; finalizing the journal entry; or any combination thereof.

In at least one embodiment, the document can be received in paper form. In at least one embodiment, the document can be received in paper form and then scanned. In at least one embodiment, the document can include one or more pages. In at least one embodiment, extracting text from the document can include performing an optical character recognition scan of the document. In at least one embodiment, identifying the at least one entity to execute the document can utilize the extracted text. In at least one embodiment, identifying the at least one location for the document can utilize the extracted text.

In at least one embodiment, the journal entry can be created in a database. In at least one embodiment, the journal entry can be created in on a touchscreen computing device 516. In at least one embodiment, the journal entry can be configured according to the at least one notarization requirement. In at least one embodiment, the journal entry can be populated with the portion of the extracted text including an identification of the document and the at least one entity.

In at least one embodiment, verifying an identity can include capturing an image of the entity. In at least one embodiment, verifying an identity can include capturing an image of an identification of the entity. In at least one embodiment, verifying an identity can include extracting data from the image of the identification of the entity. In at least one embodiment, verifying an identity can include validating the identification of the entity. In at least one embodiment, verifying an identity can include validating the identification of the entity, using the data extracted from the image of the identification of the entity. In at least one embodiment, verifying an identity can include confirming that the image of the entity matches the image of the identification of the entity, such as by using facial recognition software. In at least one embodiment, capturing the image of the identification of the entity can include scanning an identification card of the entity. In at least one embodiment, validating the identification of the entity can include matching data extracted from the image of the identification to a register of government issued identification, such as that provided by Stripe, Inc.

In at least one embodiment, finalizing the journal entry can include adding the image of the entity to the journal entry. In at least one embodiment, finalizing the journal entry can include closing the journal entry, such as by preventing further modifications to the journal entry. In at least one embodiment, finalizing the journal entry can include storing the journal entry in a secure database. In at least one embodiment, finalizing the journal entry can include providing controlled access to the journal entry, such as through a time sensitive link and/or PIN or other password. In at least one embodiment, the journal entry can be created in (and/or closed by conforming the journal entry to) a format in compliance with the Uniform Electronic Transactions Act.

In at least one embodiment, facilitating execution of the document can include creating a base layer for each page of the document. In at least one embodiment, the base layer can include an image of each page of the document. In at least one embodiment, facilitating execution of the document can include identifying at least one signature element in the document. In at least one embodiment, facilitating execution of the document can include identifying a signature coordinate of the signature element.

In at least one embodiment, facilitating execution of the document can include creating an elements layer for each page of the document, the elements layer being separate from the base layer. In at least one embodiment, the elements layer can include the signature element at the signature coordinate.

In at least one embodiment, facilitating execution of the document can include creating an interaction layer for each page of the document. In at least one embodiment, the interaction layer can be separate from the elements layer and/or the base layer. In at least one embodiment, the interaction layer can be transparent. In at least one embodiment, the interaction layer can include a signature input field, such as at the signature coordinate.

In at least one embodiment, facilitating execution of the document can include assembling a processed document by overlaying the elements layer over the base layer. In at least one embodiment, facilitating execution of the document can include assembling a processed document by overlaying the interaction layer over the elements layer. In at least one embodiment, facilitating execution of the document can include communicating the processed document to a touchscreen computing device 516.

In at least one embodiment, validating the information within the journal entry can be performed utilizing the touchscreen computing device. In at least one embodiment, closing the journal entry is be performed utilizing the touchscreen computing device 516. In at least one embodiment, capturing the image of the entity can be performed utilizing the touchscreen computing device 516. In at least one embodiment, capturing the image of the identification of the entity can be performed utilizing the touchscreen computing device 516.

In at least one embodiment, a method of journaling the notarization of a document execution can include receiving an electronic document, the electronic document comprising one or more pages; extracting text from the electronic document; identifying, from the extracted text, at least one entity to execute the electronic document; identifying, from the extracted text, at least one location for the electronic document; determining, from the location, at least one notarization requirement for execution of the electronic document; creating a journal entry for notarization of execution of the electronic document; populating the journal entry with at least a portion of the extracted text; validating information within the journal entry; verifying an identity; facilitating execution of the document; finalizing the journal entry; or any combination thereof.

In at least one embodiment, the journal entry can be created in a database. In at least one embodiment, the journal entry can be created on a touchscreen computing device 516. In at least one embodiment, the journal entry can be created according to the at least one notarization requirement. In at least one embodiment, the portion of the extracted text, the portion of the extracted or recognized text can include an identification of the electronic document and/or the at least one entity. In at least one embodiment, the journal entry can be supplemented with information not contained in the information within the journal entry can be confirmed an/or verified.

In at least one embodiment, the image of the entity and/or the fingerprint of the entity can be added to the journal entry. In at least one embodiment, finalizing the journal entry can include closing the journal entry, such as by preventing further modification of the journal entry. In at least one embodiment, finalizing the journal entry can by performed utilizing the touchscreen computing device. In at least one embodiment, finalizing the journal entry can include storing the journal entry in a secure database. In at least one embodiment, finalizing the journal entry can include providing controlled access to the journal entry.

In at least one embodiment, verifying an identity can include capturing an image of the entity, such as by utilizing the touchscreen computing device 516. In at least one embodiment, verifying an identity can include extracting data from an identification of the entity, such as by utilizing the touchscreen computing device 516. In at least one embodiment, verifying an identity can include validating the data extracted from the identification of the entity. In at least one embodiment, verifying an identity can include confirming, that the image of the entity matches the identification of the entity, such as by utilizing the touchscreen computing device 516. In at least one embodiment, verifying an identity can include capturing a fingerprint, or other biometric identifier, of the entity. In at least one embodiment, verifying an identity can include facilitating execution of the electronic document, such as by utilizing the touchscreen computing device 516.

In at least one embodiment, facilitating execution of the electronic document can include identifying at least one signature element in the document including a signature coordinate of the signature element; creating a base layer for each page of the electronic document; creating an elements layer for each page of the electronic document, the elements layer being separate from the base layer; creating an interaction layer for each page of the electronic document; assembling a processed document by overlaying the elements layer over the base layer, and overlaying the interaction layer over the elements layer; and communicating the processed document to the touchscreen computing device 516. In at least one embodiment, the base layer can include an image of each page of the electronic document. In at least one embodiment, the elements layer can include the signature element at the signature coordinate. In at least one embodiment, the interaction layer can be separate from the elements layer, and/or the base layer. In at least one embodiment, the interaction layer can be transparent. In at least one embodiment, the interaction layer can include a signature input field at the signature coordinate.

In at least one embodiment, the method can include creating an executed document. In at least one embodiment, creating an executed document can include executing the processed document. In at least one embodiment, creating an executed document can include executing the processed document on the touchscreen computing device 516. In at least one embodiment, creating an executed document can include the entity executing the processed document on the touchscreen computing device 516.

In at least one embodiment, the method can include notarizing the executed document. In at least one embodiment, the method can include notarizing the executed document on the touchscreen computing device 516. In at least one embodiment, the method can include a notary notarizing the executed document on the touchscreen computing device 516.

In at least one embodiment, a method of journaling the notarization of a document execution can include receiving a document; scanning the document, identifying and extracting key information; determining one or more notarization requirements; creating a journal entry for notarization of the document; verifying an identity of a signatory to the document; facilitating execution of the document; facilitating recordation of the document; finalizing the journal entry; or any combination thereof.

In at least one embodiment, the document is received in electronic form, such as in a PDF format. In at least one embodiment, the document can comprise one or more pages. In at least one embodiment, the document is received in paper form, and then scanned into a PDF format. In at least one embodiment, scanning the document can include performing an optical character recognition of each page of the document to recognize text from the document. In at least one embodiment, the optical character recognition is performed as the document is scanned into a PDF format. In at least one embodiment, the optical character recognition is performed on an electronic version of the document.

In at least one embodiment, identifying and extracting key information includes identifying, from the recognized text, at least one entity to execute the document, at least one physical location for the document, at least one execution location for the document, or any combination thereof. In at least one embodiment, the physical location identifies one or more articles of real property. In at least one embodiment, the execution location identifies where the entity will execute the document. In at least one embodiment, determining one or more notarization requirements is based at least in part on the physical location and/or the execution location.

In at least one embodiment, creating the journal entry for notarization of the document can include creating an entry in a database. In at least one embodiment, the journal entry can be configured according to the notarization requirement(s). In at least one embodiment, creating the journal entry can include populating the journal entry with at least a portion of the recognized text. In at least one embodiment, the portion of the recognized text can include an identification of the document and/or the entity to execute the document. In at least one embodiment, creating the journal entry can include supplementing the journal entry with information not contained in the recognized text. In at least one embodiment, creating the journal entry can include confirming information within the journal entry.

In at least one embodiment, verifying an identity of a signatory to the document can include capturing an image of the entity; capturing an image of an identification of the entity; extracting data from the image of the identification of the entity; validating the identification of the entity; confirming that the image of the entity matches the image of the identification of the entity; capturing an alternate identifier of the entity; or any combination thereof. In at least one embodiment, validating the identification of the entity can be performed based on the data extracted from the image of the identification of the entity. In at least one embodiment, confirming that the image of the entity matches the image of the identification of the entity can be performed using facial recognition analysis performed on the image of the entity and/or the image of the identification of the entity.

In at least one embodiment, capturing the image of the identification of the entity can include scanning an identification card of the entity. In at least one embodiment, validating the identification of the entity can include matching the data extracted from the image of the identification to a register of government issued identification. In at least one embodiment, the alternate identifier of the entity can be a fingerprint of the entity. In at least one embodiment, capturing the image of the entity can include capturing an image of a representative of the entity. In at least one embodiment, capturing the image of the identification of the entity can include capturing an image of an identification of the representative of the entity. In at least one embodiment, wherein capturing the alternate identifier of the entity can include capturing an alternate identifier of the representative of the entity.

In at least one embodiment, facilitating execution of the document can include creating a base layer for each page of the document, the base layer including an image of each page of the document. In at least one embodiment, facilitating execution of the document can include identifying at least one signature element in the document including a signature coordinate of the signature element. In at least one embodiment, facilitating execution of the document can include creating an elements layer for each page of the document. In at least one embodiment, the elements layer can be separate from the base layer. In at least one embodiment, the elements layer can include the signature element at the signature coordinate.

In at least one embodiment, facilitating execution of the document can include creating an interaction layer for each page of the document. In at least one embodiment, the interaction layer can be separate from the elements layer and/or the base layer. In at least one embodiment, the interaction layer can be transparent. In at least one embodiment, the interaction layer can include a signature input field at the signature coordinate.

In at least one embodiment, facilitating execution of the document can include assembling a processed document by overlaying the elements layer over the base layer. In at least one embodiment, facilitating execution of the document can include assembling a processed document by overlaying the interaction layer over the elements layer. In at least one embodiment, facilitating execution of the document can include communicating the processed document to a touchscreen computing device 516.

In at least one embodiment, facilitating execution of the document can include creating an executed document. In at least one embodiment, creating an executed document can include receiving a signature of the entity, such as into the interaction layer of the processed document on the touchscreen computing device 516. In at least one embodiment, facilitating execution of the document can include notarizing the executed document. In at least one embodiment, facilitating execution of the document can include notarizing, by a notary, the executed document on the touchscreen computing device 516. In at least one embodiment, facilitating execution of the document can include creating a finalized document by preventing further modification of the interaction layer.

In at least one embodiment, the method can include facilitating formal recordation of the finalized document. In at least one embodiment, the method can include communicating the finalized document to a recordation facility for formal recordation of the finalized document. In at least one embodiment, the method can include communicating at least a portion of the journal entry to the recordation facility.

In at least one embodiment, the method can include adding the image of the entity and/or the alternate identifier of the entity to the journal entry. In at least one embodiment, the method can include closing of finalizing the journal entry. In at least one embodiment, the method can include storing the journal entry in a secure database. In at least one embodiment, the method can include providing controlled access to the journal entry. In at least one embodiment, the journal entry can be created in (and/or closed by conforming the journal entry to) a format in compliance with the Uniform Electronic Transactions Act. In at least one embodiment, providing controlled access to the journal entry can include providing time-limited access according to credentials, such as a time expiring link and/or pin or other password.

In at least one embodiment, several of the disclosed processes may be performed together, such as concurrently, simultaneously, consecutively, or any combination thereof. For example, text and/or date can be extracted once and used with several processes concurrently, simultaneously, consecutively, or any combination thereof. In at least one embodiment, the notarization processes disclosed herein can be used in conjunction with the document execution processes described in U.S. patent application Ser. No. 17/467,152 filed Sep. 3, 2021 and entitled "SYSTEMS AND METHODS FOR ELECTRONIC DOCUMENT EXECUTION". In at least one embodiment, the notarization processes disclosed herein can be used in conjunction with the secure document management processes described in U.S. patent application Ser. No. 17/666,477 filed Feb. 7, 2022 and entitled "SYSTEMS AND METHODS FOR SECURE DOCUMENT MANAGEMENT". Both of these documents are incorporated herein by specific reference.

For example, in at least one embodiment, a method 1000 can include any or all of the steps of method 700 discussed above. In at least one embodiment, as shown in step 730, the method 1000 can include storing the data in a secure storage system. The document can be stored in a secure storage system as the document is received, in electronic form, as executed, or any combination thereof.

In at least one embodiment, the method 1000 can include recording the executed version of the document, as shown in step 735. In at least one embodiment, the document can be recorded with a governmental recordation system, such as a county clerk of court, register of deed, real estate registry, other governmental registry, or any combination thereof. In at least one embodiment, the document can be recorded with a privately operated recordation system. In at least one embodiment, the document can be recorded with a governmental recordation system using a privately operated vendor. In at least one embodiment, recording the document can include electronically transmitting the executed version of the document to the governmental recordation system. In at least one embodiment, recording the document can include electronically transmitting at least a sub-set of the data extracted from the document to the governmental recordation system.

In at least one embodiment, the data extracted from the document can be registered, as shown in step 755. In at least one embodiment, registering the data can include confirming the data conforms to a JSON format and/or an industry standard, such as those promulgated my MISMO. In at least one embodiment, the data extracted from the document can be extracted and/or conformed to a JSON format; an industry standard, such as those promulgated my MISMO; a format in compliance with the Uniform Electronic Transactions Act; or any combination thereof. In at least one embodiment, the data can be used to populate a record in a searchable database.

In at least one embodiment, the document itself can be registered, as shown in step 760. In at least one embodiment, the record can also, or alternatively, be populated with the document, such as the document as received, the electronic version of the document, the executed version of the document, or any combination thereof. In at least one embodiment, the reference to the document can include a link to the executed version of the document in the record in the searchable database.

In at least one embodiment, the document can include those typically used in a real estate transaction. In at least one embodiment, the document can include a loan document. In at least one embodiment, the document can include a deed. In at least one embodiment, the document can include a note, such as a mortgage note. In at least one embodiment, the document can include a legal document. In at least one embodiment, the data extracted and confirmed to the Uniform Electronic Transactions Act format can be used for a variety of purposes, such as the journal entry, indexing and/or registration of an electronic Note, indexing and/or registration of an electronic Deed, another legal document, or any combination thereof. In at least one embodiment, the document can be executed, notarized, secured, or any combination thereof using the touchscreen computing device 516, online, offline, or any combination thereof. In at least one embodiment, multiple documents, such as the journal entry, an electronic Note, an electronic Deed, another legal document, or any combination thereof, can be registered together, sent to a third-party database, audited, transferred, or any combination thereof, together, simultaneously, concurrently, consecutively, in the same way, or any combination thereof, without repeating steps, such as scanning, processing, or extracting data, as a single scanning, processing, or extracting step can be used for multiple processes.

In at least one embodiment, a method 1200 of managing document execution can include receiving a document, as shown in step 1202; analyzing and/or processing the document, as shown in step 1204; communicating the processed document, as shown in step 1206; assigning one or more execution devices for use with the document, as shown in step 1208; monitoring execution of the document, as shown in step 1210; notarizing the document, as shown in step 1212; finalizing the document, as shown in step 1214; recording the document, as shown in step 1216; or any combination thereof.

In at least one embodiment, a method 1200 can include any or all of the steps of any or all of the methods 200, 300, 400, 600, 700, 800, 900, 1000 discussed above. For example, in at least one embodiment, analyzing and/or processing the document can include any of the analysis and/or processing discussed above with respect to steps 104 and/or 106, such as those described in method 200, 300, 400, 600, 700, 800, 900, 1000, or any combination thereof.

For example, in at least one embodiment, analyzing and/or processing the document can include identifying a template for the document, such as described in method 200; performing an optical character recognition on the document, such as described in steps 302 and/or 702; identifying one or more signature elements in the document; identifying a notarization element in the document; or any combination thereof. In at least one embodiment, analyzing and/or processing the document can include creating a base layer including the document; creating a text layer including the text recognized the document; creating an interaction layer including input fields for the elements recognized from the document; assembling the layers; or any combination thereof.

In at least one embodiment, the method can include receiving a received document from an originating agent. In at least one embodiment, the originating agent can be the same as the signing agent and/or a representative of a lender. Thus, in at least one embodiment, the document can be received from the agent's system 508, from a LOS, or other lender system, 512, from some other agent's system, or any combination thereof. In at least one embodiment, the document can be received in PDF format and/or comprise one or more pages. In at least one embodiment, the document can be received at a processing location. In at least one embodiment, the document can be received from a computer system of an originating agent, such as at an originating agent location. In at least one embodiment, the method can include receiving, at a processing location 502, a received document in PDF format from a computer system of an originating agent at an originating agent location, the received document comprising one or more pages.

In at least one embodiment, the method can include receiving origination information about the document. In at least one embodiment, the method can include receiving, at the processing location 502, origination information about the received document from the originating agent.

In at least one embodiment, the method can include identifying a template identified by analysis of the information and/or the received document. In at least one embodiment, the template can be identified and/or saved in a repository 504 at the processing location 502. In at least one embodiment, the method can include identifying, at the processing location 502, a template saved in a repository 504 at the processing location 502, wherein the template is identified by analysis of the information and the received document.

In at least one embodiment, the method can include performing an optical character recognition (OCR) of document. In at least one embodiment, the OCR can be performed on any or all of the pages of the document. In at least one embodiment, the OCR can recognize text characters and their coordinates in the document. In at least one embodiment, the OCR can be performed at the processing location 502. In at least one embodiment, the method can include performing, at the processing location 502, an optical character recognition of each page of the received document to recognize text characters and their coordinates on each page of the received document.

In at least one embodiment, the method can include identifying one or more signature elements in the received document. In at least one embodiment, the method can include identifying a first signature coordinate of a first signature element corresponding to a first signer and a second signature coordinate of a second signature element corresponding to a second signer. In at least one embodiment, the first signer and the second signer can be the same or different people. In at least one embodiment, identifying the signature element(s) can be performed at the processing location 502 and/or with reference to the template. In at least one embodiment, the method can include identifying, at the processing location 502 with reference to the template, at least two signature elements in the received document including a first signature coordinate of a first signature element corresponding to a first signer and a second signature coordinate of a second signature element corresponding to a second signer, wherein the first signer and the second signer are different people.

In at least one embodiment, the method can include identifying at least one notarization coordinate of a notarization element in the received document. In at least one embodiment, the notarization element can correspond to a signing agent. In at least one embodiment, identifying the notarization coordinate(s) can be performed at the processing location 502 and/or with reference to the template. In at least one embodiment, the method can include identifying, at the processing location 502 with reference to the template, at least one notarization coordinate of a notarization element in the received document, the notarization element corresponding to a signing agent.

In at least one embodiment, the method can include creating a base layer for the document. In at least one embodiment, the base layer can include each page of the received document. In at least one embodiment, a base layer can be created for each page of the received document. In at least one embodiment, a base layer can be created at the processing location 502. In at least one embodiment, the method can include creating, at the processing location 502, a base layer for each page of the document, the base layer including each page of the received document.

In at least one embodiment, the method can include creating a text layer. In at least one embodiment, the text layer can be separate from the base layer and/or include the text recognized from each page of the received document. In at least one embodiment, the text layer can include each page of the received document. In at least one embodiment, a text layer can be created for each page of the received document. In at least one embodiment, a text layer can be created at the processing location 502. In at least one embodiment, the method can include creating, at the processing location 502, a text layer for each page of the document, the text layer being separate from the base layer and including the text recognized from each page of the received document.

In at least one embodiment, the method can include creating an interaction layer the document. In at least one embodiment, the interaction layer can be separate from the base layer and/or the text layer. In at least one embodiment, the interaction layer can be translucent or semi-transparent. In at least one embodiment, the interaction layer can be transparent or completely clear. In at least one embodiment, the interaction layer can include a first signature input field at the first signature coordinate, a second signature input field at the second signature coordinate, a notarization input field at the notarization coordinate, or any combination thereof. In at least one embodiment, the interaction layer can be created at the processing location 502. In at least one embodiment, the interaction layer can include each page of the document. In at least one embodiment, an interaction layer can be created for each page of the document. In at least one embodiment, the method can include creating, at the processing location 502, an interaction layer for each page of the document, the interaction layer being separate from the base layer and the text layer, the interaction layer being translucent, the interaction layer including a first signature input field at the first signature coordinate, a second signature input field at the second signature coordinate, and a notarization input field at the notarization coordinate.

In at least one embodiment, the method can include assembling a processed document by overlaying the various layers. For example, the text layer can be layered over the base layer and/or the interaction layer layered over the text layer. In at least one embodiment, the assembling can be performed at the processing location 502. In at least one embodiment, the method can include assembling, at the processing location 502, a processed document by overlaying the text layer over the base layer, and overlaying the interaction layer over the text layer.

In at least one embodiment, the method can include communicating the processed document. In at least one embodiment, the processed document can be communicated from the processing location 502. In at least one embodiment, the processed document can be communicated to a first touchscreen computing device 516. In at least one embodiment, the processed document can be communicated to the signing agent's location, such as agent's location 506, 508. In at least one embodiment, the method can include communicating the processed document from the processing location 502 to a first touchscreen computing device 516 at the signing agent's location, such as agent's location 506, 508.

In at least one embodiment, the method can include assigning an execution device 530,532,534 to each signer. In at least one embodiment, the method can include assigning a first execution device 530 to the first signer. In at least one embodiment, assigning the first execution device 530 to the first signer can configure the first execution device 530 to interact with the first signature input field. In at least one embodiment, assigning the first execution device 530 to the first signer can prevent the first execution device 530 from interacting with the second signature input field and/or the notarization input field. In at least one embodiment, assigning the execution device(s) 530,532,534 to the signer(s) can be performed at the signing agent's location, such as agent's location 506, 508. In at least one embodiment, the method can include assigning, at the signing agent's location, such as agent's location 506, 508, a first execution device 530 to the first signer, thereby configuring the first execution device 530 to interact with the first signature input field and preventing the first execution device 530 from interacting with the second signature input field and the notarization input field.

In at least one embodiment, the first execution device 530 can communicate with the first touchscreen computing device 516, such as through a Bluetooth connection, over a LAN connection, a WiFi connection or another wired or wireless connection. In at least one embodiment, the first execution device 530 can communicate with other components of the system 500 through the network 518 and/or directly. For example, in at least one embodiment, the first execution device 530 can communicate with the originating, closing, and/or signing agent's office computer 506 and/or the originating, closing, and/or signing agent's system 508.

In at least one embodiment, the method can include assigning a second execution device 532 to the second signer. In at least one embodiment, assigning the second execution device 532 to the second signer can configure the second execution device 532 to interact with the second signature input field. In at least one embodiment, assigning the second execution device 532 to the second signer can prevent the second execution device 532 from interacting with the first signature input field and/or the notarization input field. In at least one embodiment, the method can include assigning, at the signing agent's location 506,508, a second execution device 532 to the second signer, thereby configuring the second execution device 532 to interact with the second signature input field and preventing the second execution device 532 from interacting with the first signature input field and the notarization input field.

In at least one embodiment, the method can include receiving information from and/or about each signer. In at least one embodiment, the method can include receiving information from the first and/or second signer. In at least one embodiment, the information from the first and/or second signer can be received by and/or into the first touchscreen computing device 516. In at least one embodiment, the information from the first and/or second signer can be received by and/or using the execution devices 530,532. In at least one embodiment, the method can include receiving, into the first touchscreen computing device 516, first and/or second information from the first signer and/or second information from the second signer. In at least one embodiment, receiving the information from the first and second signer can be done concurrently and/or consecutively.

In at least one embodiment, the method can include populating the processed document with the information received from the signer(s). In at least one embodiment, the method can include populating the processed document with the first and/or second information. In at least one embodiment, populating the processed document with the information received from the signer(s) can be performed on or by the first touchscreen computing device 516. In at least one embodiment, populating the processed document with the information received from the signer(s) can be performed by and/or using the execution devices 530,532. In at least one embodiment, the method can include populating, by the first touchscreen computing device 516, the processed document with the first and/or second information. In at least one embodiment, populating the processed document with the information received from the first and second signer can be done concurrently and/or consecutively.

In at least one embodiment, the method can include monitoring each signer's progress through the processed document. In at least one embodiment, this monitoring can be performed on and/or by the first touchscreen computing device 516. In at least one embodiment, the method can include monitoring, on the first touchscreen computing device 516, the first and/or second signer's progress through the processed document.

In at least one embodiment, the method can include confirming each signer's completion of the processed document. In at least one embodiment, the method can include confirming the first and/or the second signer's completion of the processed document. In at least one embodiment, this confirming can be performed on and/or by the first touchscreen computing device 516. In at least one embodiment, the method can include confirming, on the first touchscreen computing device 516, the first signer's completion of the processed document.

In at least one embodiment, the method can include assigning another execution device to the signing agent. In at least one embodiment, the method can include assigning a third execution device 534 to the signing agent. In at least one embodiment, assigning the execution device to the signing agent can configure that execution device to interact with the notarization input field. In at least one embodiment, assigning the execution device to the signing agent can prevent that execution device from interacting with the first signature input field and/or second signature input field. In at least one embodiment, assigning the execution device to the signing agent can be performed at the signing agent's location. In at least one embodiment, the method can include assigning, at the signing agent's location 506,508, a third execution device 534 to the signing agent, thereby configuring the third execution device 534 to interact with the notarization input field and preventing the third execution device 534 from interacting with the first signature input field and second signature input field.

In at least one embodiment, the method can include receiving information from the signing agent. In at least one embodiment, the information from the signing agent can be received by and/or into the first touchscreen computing device 516. In at least one embodiment, the information from the signing agent can be received by and/or using any of the execution devices 530,532,534. In at least one embodiment, the method can include receiving, into the first touchscreen computing device 516 and/or using the third execution device 534, third information from the signing agent.

In at least one embodiment, the method can include populating the processed document with the information from the signing agent. In at least one embodiment, the processed document can be populated with the information from the signing agent by the first touchscreen computing device 516. In at least one embodiment, the method can include populating, by the first touchscreen computing device 516, the processed document with the third information.

In at least one embodiment, the method can include monitoring the signing agent's progress through the processed document. In at least one embodiment, the method can include monitoring, on the first touchscreen computing device 516, the signing agent's progress through the processed document.

In at least one embodiment, the method can include confirming the signing agent's completion of the processed document. In at least one embodiment, the method can include confirming, on the first touchscreen computing device 516, the signing agent's completion of the processed document.

In at least one embodiment, the method can include creating a finalized document by preventing further modification of the base layer, the text layer, the interaction layer, or any combination thereof. In at least one embodiment, creating the finalized document can be performed at the processing location 502. In at least one embodiment, creating the finalized document can be performed on or by the first touchscreen computing device 516. In at least one embodiment, the method can include creating, at the processing location 502, a finalized document by preventing further modification of the base layer, the text layer, and the interaction layer.

In at least one embodiment, the method can include communicating the finalized document. In at least one embodiment, the method can include communicating the finalized document from the processing location 502. In at least one embodiment, the method can include communicating the finalized document from the first touchscreen computing device 516. In at least one embodiment, the method can include communicating the finalized document to a recordation facility 520, such as for formal recordation of the finalized document. In at least one embodiment, the method can include communicating the finalized document from the processing location to a recordation facility 520 for formal recordation of the finalized document.

In at least one embodiment, the first signer and the second signer can execute the processed document concurrently or simultaneously. In at least one embodiment, the first execution device 530 can be physically distinct from the second execution device 532. In at least one embodiment, the first signer and the second signer can execute the processed document consecutively. In at least one embodiment, the first execution device 530 can be the same physical device as the second execution device 532. In at least one embodiment, the first execution device 530 can be first assigned as the first execution device 530 and then subsequently assigned as the second execution device 532. In at least one embodiment, the first execution device 530 or the second execution device 532 can subsequently assigned as the third execution device 534. In at least one embodiment, the first execution device 530 can be the same physical device as the second execution device 532, but it is first assigned as the first execution device 530 and then later assigned as the second execution device 532.

In at least one embodiment, any of the execution device(s) 530,532,534 can be an electronic stylus coupled to a touchscreen computing device, such as the first touchscreen computing device 516. In at least one embodiment, the first execution device 530 can be an electronic stylus coupled to the first touchscreen computing device 516. In at least one embodiment, any of the execution device(s) 530,532,534 can include another touchscreen computing device physically distinct from the first touchscreen computing device 516. In at least one embodiment, the first execution device 530 can include a second touchscreen computing device physically distinct from the first touchscreen computing device 516. In at least one embodiment, the second execution device 532 can include a third touchscreen computing device physically distinct from the first touchscreen computing device 516 and the second touchscreen computing device. In at least one embodiment, the third execution device 534 includes the first touchscreen computing device 516. In at least one embodiment, each execution device(s) 530,532,534 can be the same physical device, such as a stylus or a touchscreen computing device, and be consecutively reassigned, as needed.

In at least one embodiment, monitoring a signer's progress through the processed document can include alerting the signing agent that the associated execution device 530,532, 534 attempted to interact with an input field associated with someone else. In at least one embodiment, monitoring the first signer's progress through the processed document can include alerting the signing agent that the first execution device 530 attempted to interact with the second signature input field. In at least one embodiment, alerting the signing agent can be performed on and/or by the first touchscreen computing device 516. In at least one embodiment, alerting the signing agent can be performed on and/or by any of the execution device(s) 530,532,534. In at least one embodiment, monitoring the first signer's progress through the processed document can include alerting the signing agent, on the first touchscreen computing device 516, that the first execution device 530 attempted to interact with the second signature input field.

In at least one embodiment, the first signer and the second signer can execute the processed document at the signing agent's location 506,508. In at least one embodiment, the first signer can execute the processed document remotely from the second signer and/or the signing agent's location 506,508. In at least one embodiment, the first signer and the second signer can execute the processed document in the presences of the signing agent and/or at or remote from the signing agent's location 506,508.

In at least one embodiment, the signature input field(s) can be depicted in the processed document using one or more colors. In at least one embodiment, the different signature input fields can be depicted in the processed document using different colors. In at least one embodiment, the first signature input field can be depicted in the processed document using a first color and the second signature input field is depicted in the processed document using a second color, wherein the first color and the second color are different.

In at least one embodiment, the method can include verifying an identity of each signer. In at least one embodiment, the verifying can be performed by the signing agent. In at least one embodiment, the method can include verifying, by the signing agent, an identity of the first and/or second signer.

In at least one embodiment, the method can include affixing a notary seal to the processed document after the signer(s) have executed the processed document. In at least one embodiment, the method can include affixing a notary seal to the processed document after the first and/or second signer has executed the processed document.

In at least one embodiment, identifying the template can be based, at least in part, on previous analysis of a previous document of the same type as the received document. In at least one embodiment, identifying the template can be based, at least in part, on previous analysis of a previous document from the same source as the received document.

In at least one embodiment, any of the originating agent, the signing agent, and a closing agent can be the same person and/or from the same agency or different people and/or from different agencies. In at least one embodiment, the originating agent can be a different person from the signing agent. In at least one embodiment, the originating agent can be a different person from the first signer and the second signer. In at least one embodiment, the signing agent can be a different person from the first signer and the second signer. In at least one embodiment, the signing agent can be the first signer and/or the second signer. In at least one embodiment, one person may fulfill multiple roles. In at least one embodiment, any or all of the roles can be fulfilled by different people, or combinations thereof, i.e one person fulfils one or more roles and another, different person fulfills one or more other roles.

In at least one embodiment, a method of managing document execution can include receiving an electronic document; receiving origination information about the electronic document; performing an optical character recognition the electronic document to recognize text characters and their coordinates; identifying one or more signature coordinate(s) of one or more signature element (s) in the electronic document; identifying at least one notarization coordinate of a notarization element in the electronic document; creating a base layer including each page of the received document; creating an interaction layer including a signature input field at each signature coordinate and a notarization input field at the notarization coordinate; assembling a processed document by overlaying the interaction layer over the base layer; communicating the processed document to a first touchscreen computing device 516; verifying an identity of the signer(s); assigning an execution device 530,532,534 to each signer; receiving information from the signer(s); populating the processed document with that information; monitoring the progress of each signer through the processed document; receiving each signer's signature in the appropriate signature input field; confirming each signer's completion of the processed document; receiving notarization information from the signing agent; populating the processed document with the notarization information; receiving the signing agent's notarization in the notarization input field; creating a finalized document by preventing further modification of the interaction layer; and communicating the finalized document to a recordation facility 520 for formal recordation of the finalized document.

In at least one embodiment, the electronic document can be received at a processing location 502 and/or from an originating agent. In at least one embodiment, the origination information can be received at a processing location and/or from an originating agent. In at least one embodiment, the optical character recognition can be performed at the processing location 502 and/or on each page of the electronic document.

In at least one embodiment, the signature coordinate identification can be performed at the processing location 502 and/or with reference to the origination information. In at least one embodiment, each signature element can correspond to a different signer. In at least one embodiment, multiple signature elements can correspond to a single signer. In at least one embodiment, a first signature element can correspond to a first signer and/or a second signature element can correspond to a second signer. In at least one embodiment, identifying the notarization coordinate can be performed at the processing location 502 and/or with reference to the origination information. In at least one embodiment, the notarization element can correspond to a signing agent.

In at least one embodiment, creating the base layer can be performed at the processing location 502. In at least one embodiment, a base layer can be created for each page of the document. In at least one embodiment, the base layer can include each page of the document. In at least one embodiment, creating the interaction layer can be performed at the processing location 502. In at least one embodiment, an interaction layer can be created for each page of the document. In at least one embodiment, the interaction layer can include each page of the document. In at least one embodiment, the interaction layer can be separate from the base layer. In at least one embodiment, the interaction layer can be translucent. In at least one embodiment, the interaction layer can include a signature input field at each signature coordinate and/or a notarization input field at the notarization coordinate.

In at least one embodiment, the processed document can be assembled at the processing location 502. In at least one embodiment, the processed document can be communicated from the processing location 502. In at least one embodiment, the processed document can be communicated to a touchscreen computing device 516.

In at least one embodiment, the signing agent can verify the identity of the signer(s). In at least one embodiment, the signing agent can assign the execution device(s) 530,532, 534 to each signer. In at least one embodiment, assigning the execution device(s) 530,532,534 to each signer can configure the execution device(s) 530,532,534 to interact with an appropriate signature input field and/or prevent that execution device(s) 530,532,534 from interacting with an inappropriate input field. In at least one embodiment, assigning the first execution device 530 to the first signer can configure the first execution device 530 to interact with the first signature input field and preventing the first execution device 530 from interacting with the notarization input field.

In at least one embodiment, receiving the information from the first signer can be performed by and/or into the first touchscreen computing device 516. In at least one embodiment, populating the processed document with the first information can be performed on and/or by the first touchscreen computing device 516. In at least one embodiment, monitoring the first signer's progress through the processed document can be performed on and/or by the first touchscreen computing device 516. In at least one embodiment, receiving the first signer's signature in the first signature input field can be performed on and/or by the first touchscreen computing device 516. In at least one embodiment, confirming the first signer's completion of the processed document can be performed on and/or by the first touchscreen computing device 516.

In at least one embodiment, assigning a second execution device 532 to the signing agent can be performed by the signing agent. In at least one embodiment, assigning the second execution device 530 to the signing agent can configure the second execution device 530 to interact with the notarization input field. In at least one embodiment, assigning the second execution device 530 to the signing agent can prevent the second execution device 530 from interacting with the first signature input field.

In at least one embodiment, receiving notarization information from the signing agent can be performed by and/or into the first touchscreen computing device 516. In at least one embodiment, populating the processed document with the notarization information can be performed on and/or by the first touchscreen computing device 516. In at least one embodiment, receiving the signing agent's notarization in the notarization input field can be performed on and/or by the first touchscreen computing device 516. In at least one embodiment, creating the finalized document can be performed on and/or by the first touchscreen computing device 516. In at least one embodiment, creating the finalized document can be performed remotely from the first touchscreen computing device 516, such as at a processing location 502. In at least one embodiment, the finalized document can be communicated, for formal recordation of the finalized document, from the first touchscreen computing device 516 or a processing location 502. In at least one embodiment, the finalized document can be communicated, for formal recordation of the finalized document, to a recordation facility 520.

In at least one embodiment, several of the disclosed processes may be performed separately, independently, in different locations, or any combination thereof. For example, in at least one embodiment, initial processing of the document can be performed at the processing location 502. In at least one embodiment, creation of the journal entry can be performed at a closing agent's office and/or utilizing the closing agent's office computer 506. In at least one embodiment, the processed document can be transferred to the touchscreen computing device 516, such as from the closing agent's office computer 506. In at least one embodiment, the document can be executed and/or notarized on the touchscreen computing device 516. In at least one embodiment, the document execution and/or notarization, such as on the touchscreen computing device 516, can occur at closing agent's office or remotely, such as at a location associated with the document. Once the processed document is transferred to the touchscreen computing device 516, that device 516 can be taken virtually anywhere, can be independent of any of the other systems described herein, can by operated where no network connection and/or power exists, or any combination thereof. In at least one embodiment, the touchscreen computing device 516 can be used to retrieve documents and arrange them onscreen, as needed. In at least one embodiment, the touchscreen computing device 516 can be used to flag specific pages for printing and/or signing, as well as flag those pages that need not be printed and/or signed, in creating a final execution packet, which may include other documents and/or files added from their desktop and a server. For example, any necessary additional documents and/or files, such as a digital notary stamp, as well as further detail about and/or relating to the document, such as a x,y coordinate markup of the document can be loaded or pre-loaded onto the touchscreen computing device 516 for remote execution of the document. Once the executed document is created, such as on the touchscreen computing device 516, the executed document can be transferred from the touchscreen computing device 516, such as for recordation and/or other secure storage, when a network connection is established, such as when the touchscreen computing device 516 returns to closing agent's office.

In at least one embodiment, the journal entry can be finalized on the touchscreen computing device 516. In at least one embodiment, the journal entry can be finalized, such as on the touchscreen computing device 516, at closing agent's office or remotely, such as at a location associated with the document. In at least one embodiment, the journal entry can be transferred from the touchscreen computing device 516, such as for secure storage and/or access, when a network connection is established, such as when the touchscreen computing device 516 returns to closing agent's office.

Other and further embodiments utilizing one or more aspects of the disclosure can be devised without departing from the spirit of Applicants' disclosure. For example, the devices, systems and methods can be implemented for numerous different types and sizes in numerous different industries. Further, the various methods and embodiments of the devices, systems and methods can be included in combination with each other to produce variations of the disclosed methods and embodiments. Discussion of singular elements can include plural elements and vice-versa. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

The inventions have been described in the context of preferred and other embodiments and not every embodiment of the inventions has been described. Obvious modifications and alterations to the described embodiments are available to those of ordinary skill in the art having the benefits of the present disclosure. The disclosed and undisclosed embodiments are not intended to limit or restrict the scope or applicability of the inventions conceived of by the Applicants, but rather, in conformity with the patent laws, Applicants intend to fully protect all such modifications and improvements that come within the scope or range of equivalents of the following claims.

What is claimed is:

1. A method of managing document execution, the method comprising:
   receiving, at a processing location, a received document in PDF format from a computer system of an originating agent at an originating agent location, the received document comprising one or more pages;
   receiving, at the processing location, origination information about the received document from the originating agent;
   identifying, at the processing location, a template saved in a repository at the processing location, wherein the template is identified by analysis of the information and the received document;
   performing, at the processing location, an optical character recognition of each page of the received document to recognize text characters and their coordinates on each page of the received document;
   identifying, at the processing location with reference to the template, at least two signature elements in the received document including a first signature coordinate of a first signature element corresponding to a first signer and a second signature coordinate of a second signature element corresponding to a second signer, wherein the first signer and the second signer are different people;
   identifying, at the processing location with reference to the template, at least one notarization coordinate of a notarization element in the received document, the notarization element corresponding to a signing agent;
   creating, at the processing location, a base layer for each page of the document, the base layer including each page of the received document;
   creating, at the processing location, a text layer for each page of the document, the text layer being separate from the base layer and including the text recognized from each page of the received document;
   creating, at the processing location, an interaction layer for each page of the document, the interaction layer being separate from the base layer and the text layer, the interaction layer being translucent, the interaction layer including a first signature input field at the first signature coordinate, a second signature input field at the second signature coordinate, and a notarization input field at the notarization coordinate;
   assembling, at the processing location, a processed document by overlaying the text layer over the base layer, and overlaying the interaction layer over the text layer;
   communicating the processed document from the processing location to a first touchscreen computing device at the signing agent's location;
   assigning, at the signing agent's location, a first execution device to the first signer, thereby configuring the first execution device to interact with the first signature input field and preventing the first execution device from interacting with the second signature input field and the notarization input field;
   receiving, into the first touchscreen computing device, first information from the first signer;
   populating, by the first touchscreen computing device, the processed document with the first information;
   monitoring, on the first touchscreen computing device, the first signer's progress through the processed document;
   confirming, on the first touchscreen computing device, the first signer's completion of the processed document;
   assigning, at the signing agent's location, a second execution device to the second signer, thereby configuring the second execution device to interact with the second signature input field and preventing the second execution device from interacting with the first signature input field and the notarization input field;
   receiving, into the first touchscreen computing device, second information from the second signer;
   populating, by the first touchscreen computing device, the processed document with the second information;
   monitoring, on the first touchscreen computing device, the second signer's progress through the processed document;
   confirming, on the first touchscreen computing device, the second signer's completion of the processed document;
   assigning, at the signing agent's location, a third execution device to the signing agent, thereby configuring the third execution device to interact with the notarization input field and preventing the third execution device from interacting with the first signature input field and second signature input field;
   receiving, into the first touchscreen computing device, third information from the signing agent;
   populating, by the first touchscreen computing device, the processed document with the third information;

monitoring, on the first touchscreen computing device, the signing agent's progress through the processed document;

confirming, on the first touchscreen computing device, the signing agent's completion of the processed document;

creating, at the processing location, a finalized document by preventing further modification of the base layer, the text layer, and the interaction layer; and communicating the finalized document from the processing location to a recordation facility for formal recordation of the finalized document.

2. The method of claim 1, wherein the first signer and the second signer execute the processed document concurrently.

3. The method of claim 2, wherein the first execution device is physically distinct from the second execution device.

4. The method of claim 1, wherein the first signer and the second signer execute the processed document consecutively.

5. The method of claim 4, wherein the first execution device is the same physical device as the second execution device, but is first assigned as the first execution device and then later assigned as the second execution device.

6. The method of claim 1, wherein the first execution device is an electronic stylus coupled to the first touchscreen computing device.

7. The method of claim 1, wherein the first execution device includes a second touchscreen computing device physically distinct from the first touchscreen computing device.

8. The method of claim 7, wherein the second execution device includes a third touchscreen computing device physically distinct from the first touchscreen computing device and the second touchscreen computing device.

9. The method of claim 8, wherein the third execution device includes the first touchscreen computing device.

10. The method of claim 1, wherein monitoring the first signer's progress through the processed document includes alerting the signing agent, on the first touchscreen computing device, that the first execution device attempted to interact with the second signature input field.

11. The method of claim 1, wherein the first signer and the second signer execute the processed document at the signing agent's location.

12. The method of claim 1, wherein the first signer executes the processed document remotely from the signing agent's location.

13. The method of claim 1, wherein the first signature input field is depicted in the processed document using a first color and the second signature input field is depicted in the processed document using a second color, wherein the first color and the second color are different.

14. The method of claim 1, wherein the method further includes— verifying, by the signing agent, an identity of the first signer; and affixing a notary seal to the processed document after the first signer has executed the processed document.

15. The method of claim 1, wherein identifying the template is based, at least in part, on previous analysis of a previous document of the same type as the received document.

16. The method of claim 1, wherein identifying the template is based, at least in part, on previous analysis of a previous document from the same source as the received document.

17. The method of claim 1, wherein the originating agent is a different person from the signing agent.

18. The method of claim 1, wherein the signing agent is a different person from the first signer and second signer.

19. A method of managing document execution, the method comprising:

receiving, at a processing location, an electronic document from an originating agent;

receiving, at the processing location, origination information about the electronic document from the originating agent;

performing, at the processing location, an optical character recognition of each page of the electronic document to recognize text characters and their coordinates on each page of the electronic document;

identifying, at the processing location with reference to the origination information, a first signature coordinate of a first signature element in the electronic document, the first signature element corresponding to a first signer;

identifying, at the processing location with reference to the origination information, at least one notarization coordinate of a notarization element in the electronic document, the notarization element corresponding to a signing agent;

creating, at the processing location, a base layer for each page of the document, the base layer including each page of the electronic document;

creating, at the processing location, an interaction layer for each page of electronic the document, the interaction layer being separate from the base layer, the interaction layer being translucent, the interaction layer including a first signature input field at the first signature coordinate and a notarization input field at the notarization coordinate;

assembling, at the processing location, a processed document by overlaying the interaction layer over the base layer;

communicating the processed document from the processing location to a first touchscreen computing device;

verifying, by the signing agent, an identity of the first signer;

assigning, by the signing agent, a first execution device to the first signer, thereby configuring the first execution device to interact with the first signature input field and preventing the first execution device from interacting with the notarization input field;

receiving, into the first touchscreen computing device, first information from the first signer;

populating, by the first touchscreen computing device, the processed document with the first information;

monitoring, on the first touchscreen computing device, the first signer's progress through the processed document;

receiving, on the first touchscreen computing device, the first signer's signature in the first signature input field;

confirming, on the first touchscreen computing device, the first signer's completion of the processed document;

assigning, by the signing agent, a second execution device to the signing agent, thereby configuring the second execution device to interact with the notarization input field and preventing the second execution device from interacting with the first signature input field;

receiving, into the first touchscreen computing device, notarization information from the signing agent;

populating, by the first touchscreen computing device, the processed document with the notarization information;

receiving, on the first touchscreen computing device, the signing agent's notarization in the notarization input field;

creating, on the first touchscreen computing device, a finalized document by preventing further modification of the interaction layer; and communicating the finalized document from to a recordation facility for formal recordation of the finalized document.

\* \* \* \* \*